United States Patent

Sawahashi et al.

[11] Patent Number: 6,137,788
[45] Date of Patent: Oct. 24, 2000

[54] CDMA DEMODULATING APPARATUS

[75] Inventors: Mamoru Sawahashi; Hidehiro Andou, both of Yokohama; Yoshinori Miki; Kenichi Higuchi, both of Yokosuka, all of Japan

[73] Assignee: NTT Mobile Communications Network, Inc., Tokyo, Japan

[21] Appl. No.: 08/793,051

[22] PCT Filed: Jun. 12, 1996

[86] PCT No.: PCT/JP96/01582

§ 371 Date: Feb. 12, 1997

§ 102(e) Date: Feb. 12, 1997

[87] PCT Pub. No.: WO96/42146

PCT Pub. Date: Dec. 27, 1996

[30] Foreign Application Priority Data

| Jun. 13, 1995 | [JP] | Japan | 7-146191 |
| Jun. 13, 1995 | [JP] | Japan | 7-146473 |
| Dec. 8, 1995 | [JP] | Japan | 7-320787 |
| Dec. 14, 1995 | [JP] | Japan | 7-325881 |

[51] Int. Cl.$^7$ ........................ H04J 13/00
[52] U.S. Cl. .................. 370/342; 370/442; 370/479; 375/200
[58] Field of Search ............. 370/332, 320, 370/333, 280, 335, 337, 342, 344, 347, 441, 442, 468, 321, 326, 479; 375/367, 358, 242, 200; 455/501

[56] References Cited

U.S. PATENT DOCUMENTS

| 5,105,435 | 4/1992 | Stilwell | 375/200 |
| 5,224,122 | 6/1993 | Bruckert | 375/200 |
| 5,235,612 | 8/1993 | Stilwell et al. | 375/200 |
| 5,325,394 | 6/1994 | Bruckert | 375/200 |
| 5,418,814 | 5/1995 | Hulbert | 370/342 |
| 5,787,112 | 7/1998 | Murai | 375/367 |
| 5,872,776 | 2/1999 | Yang | 370/342 |
| 5,926,471 | 7/1999 | Shoji | 370/342 |

*Primary Examiner*—Dang Ton
*Assistant Examiner*—Tuan Q. Ho
*Attorney, Agent, or Firm*—Brown Raysman Millstein Felder & Steiner, LLP

[57] ABSTRACT

A CDMA demodulating apparatus with an improved interference canceling effect when there are a large number of communicators. A reception signal having a frame configuration in which a pilot signal of a known pattern is inserted between information signals is received from a plurality of communicators. Transmission data of each communicator is demodulated, an interference canceler for estimating is provided in a plurality of stages, in each channel of each stage, a variation of transmission path is estimated in each path to achieve data demodulation and estimation of interference replica. The later the stage, the more error of interference signal replica can be reduced, thereby improving the interference canceling effect. An even better effect can be obtained when interference canceling is performed after detecting a reception level of each channel by summation of reception power of each path of each channel, and channel ranking is determined in the order of higher reception level.

29 Claims, 33 Drawing Sheets

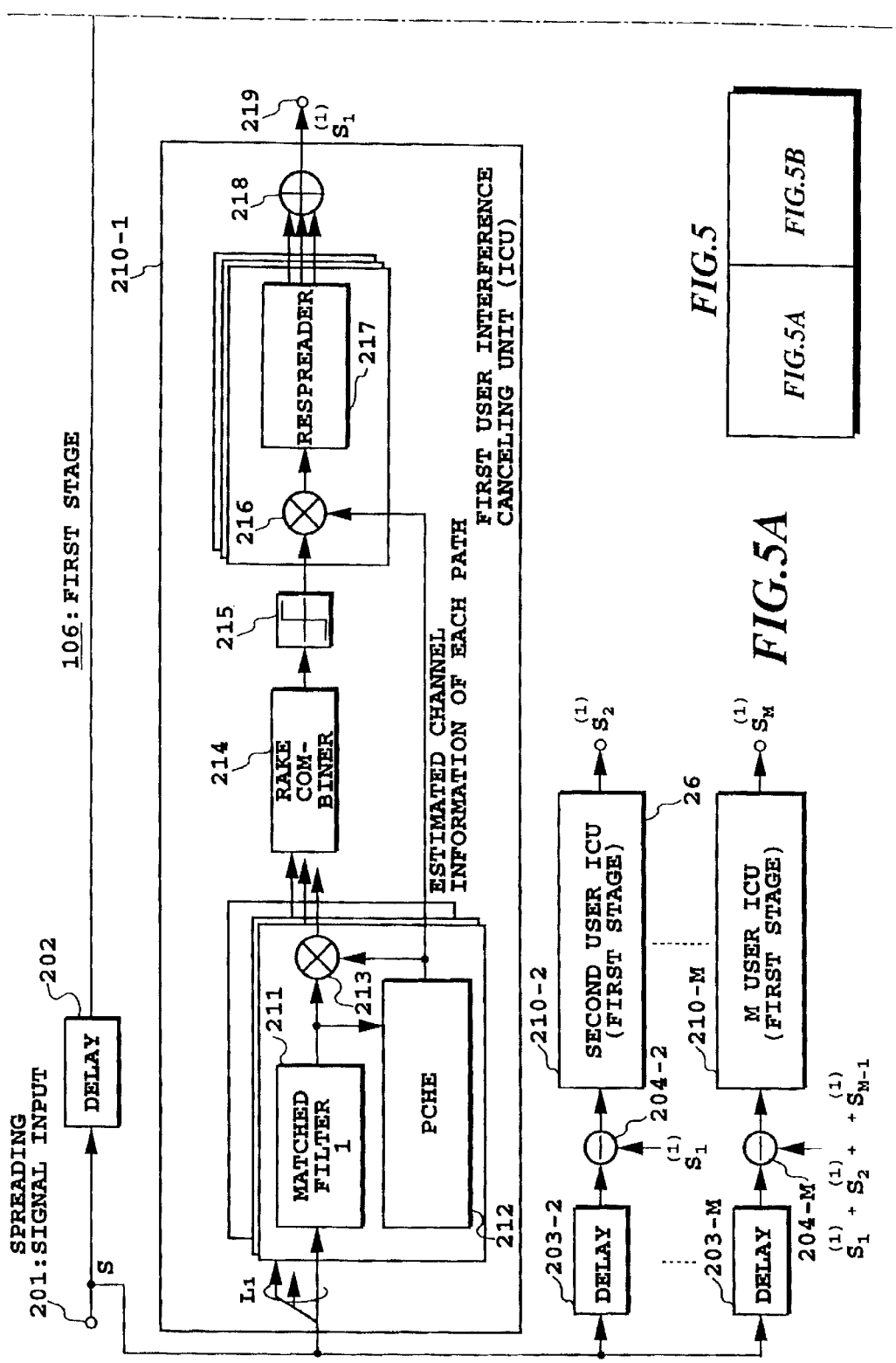

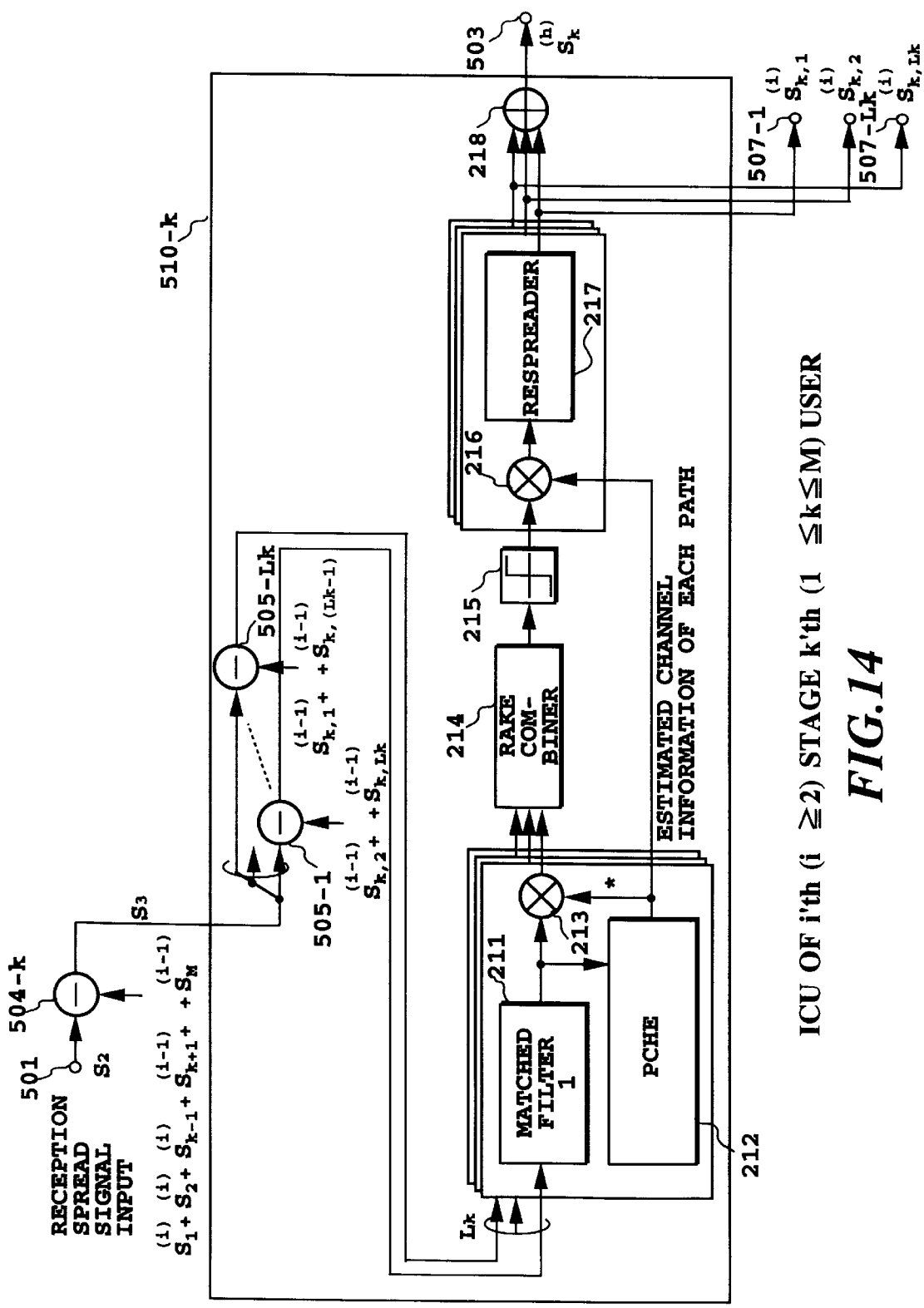
FIG.14 ICU OF i'th (i ≥2) STAGE k'th (1 ≤k ≤M) USER

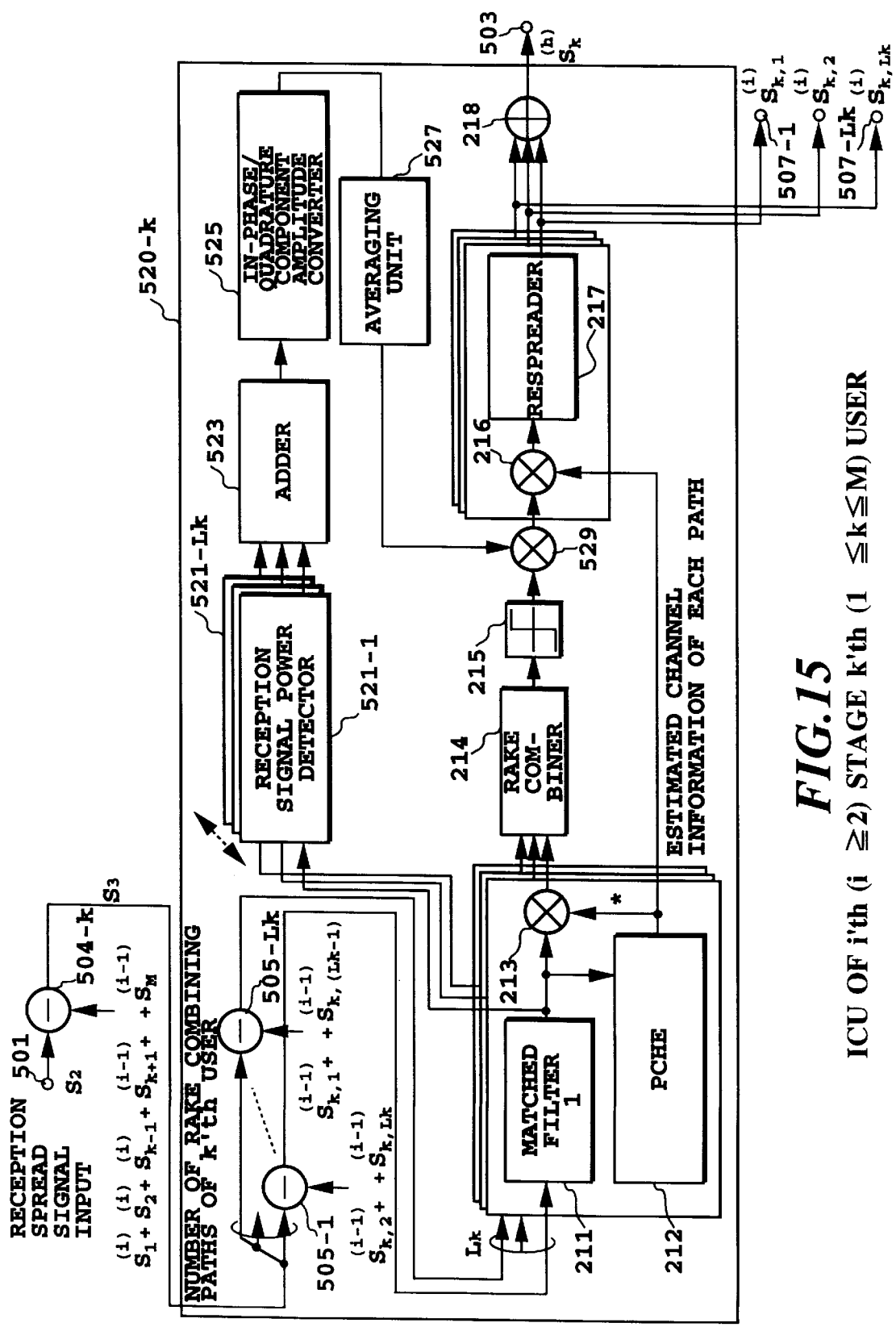
*FIG.15* ICU OF i'th (i ≥ 2) STAGE k'th (1 ≤ k ≤ M) USER

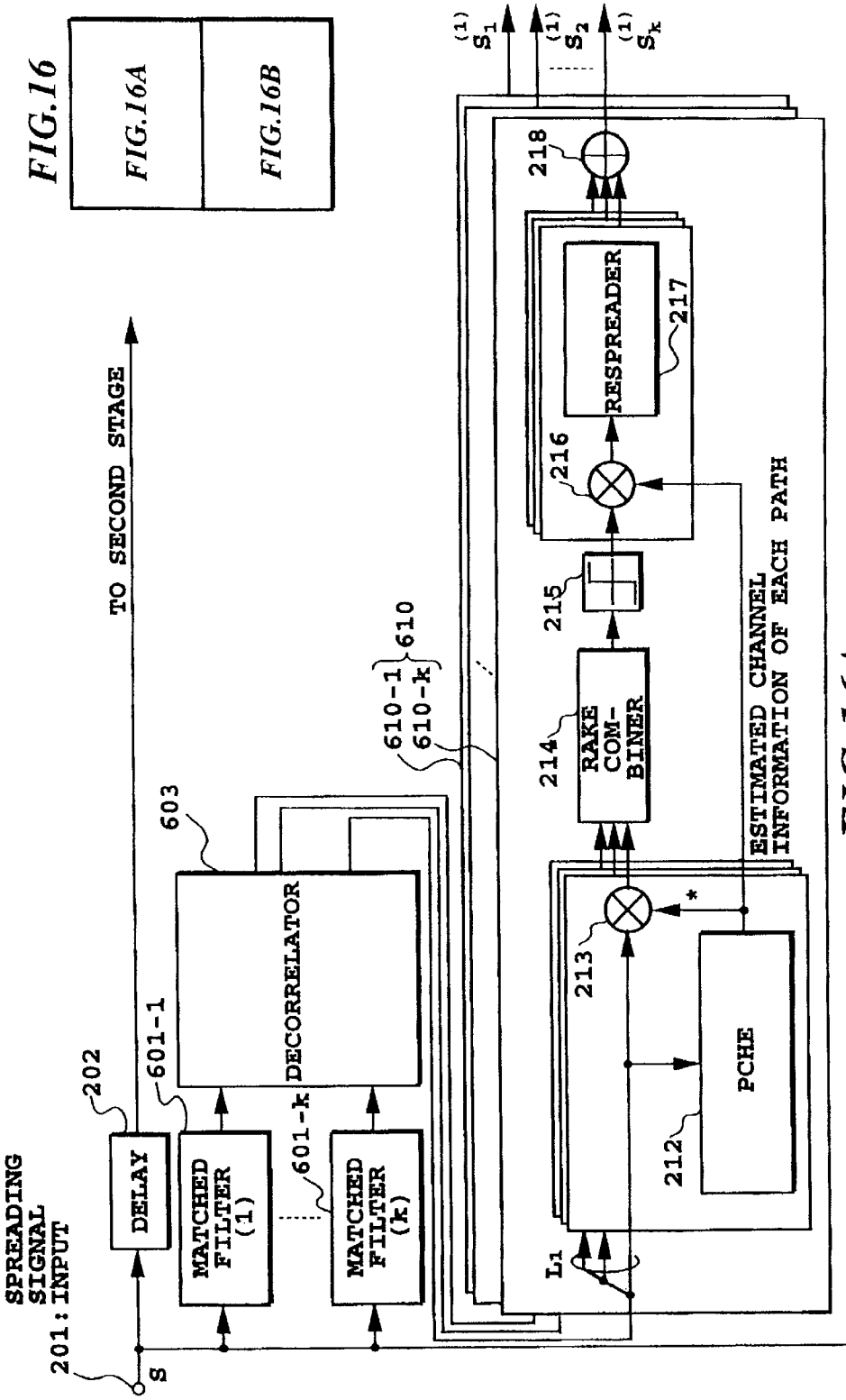

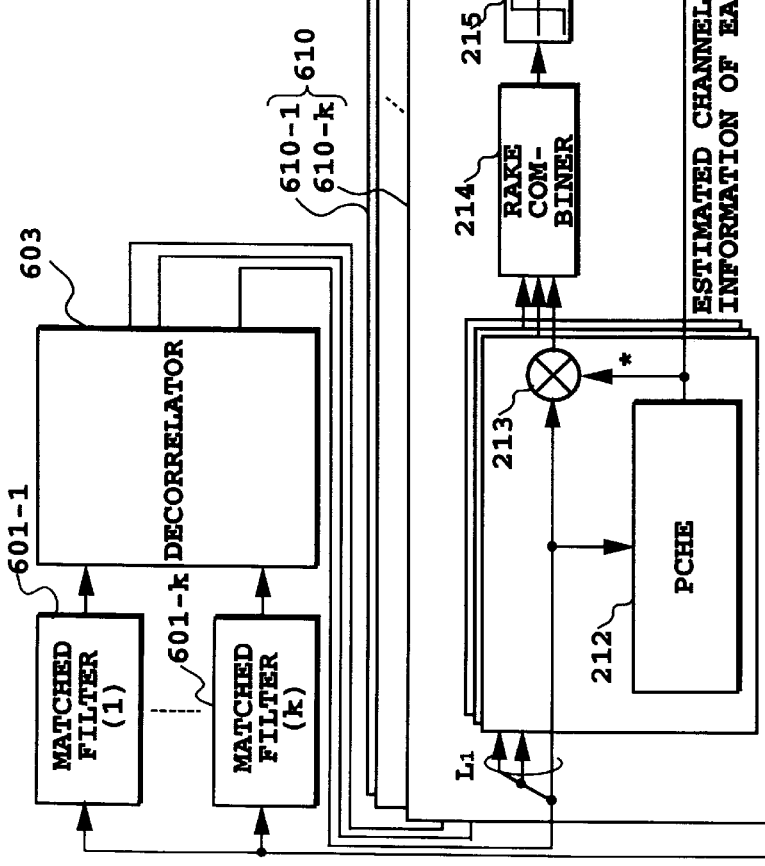

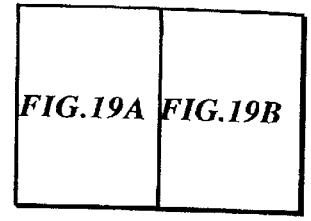
*FIG.19*
*FIG.19A*
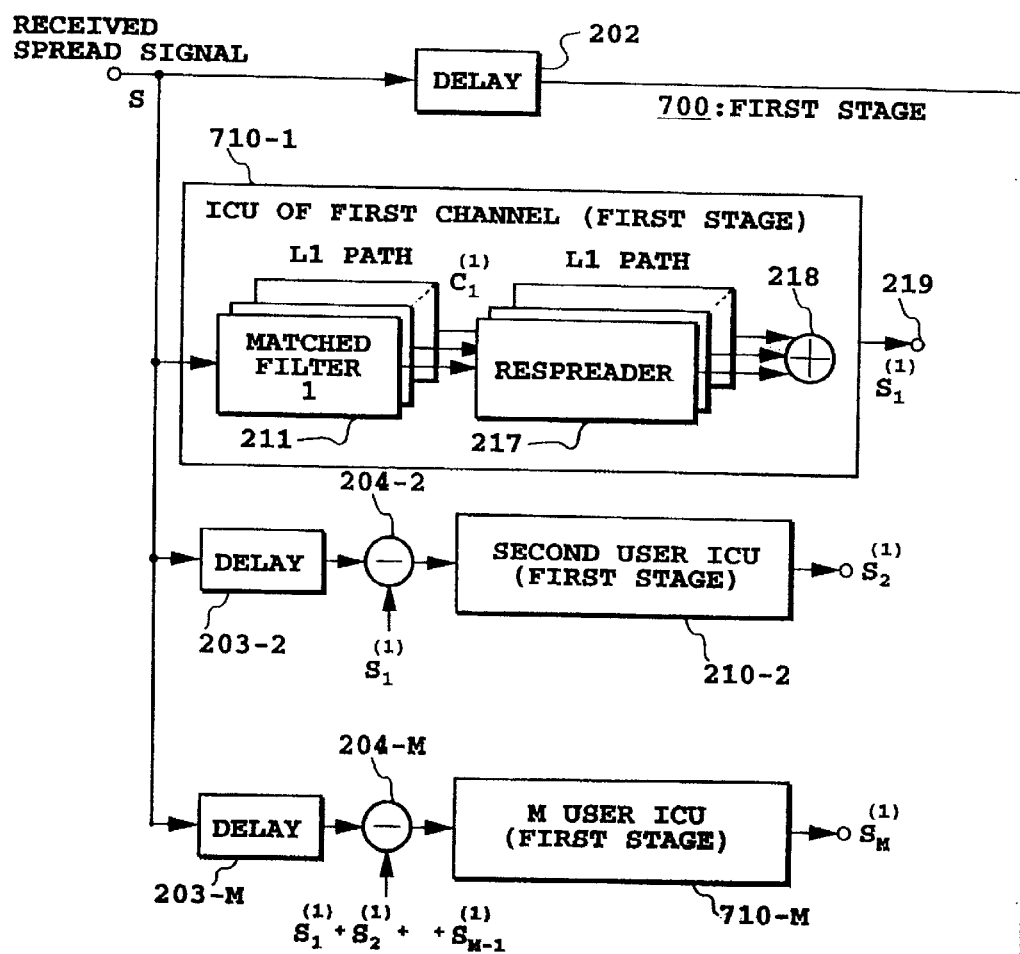

FRAME ERROR RATIO THRESHOLD VALUE GENERATOR

WHEN PILOT SYMBOL BIT ERROR RATIO IS MEASURED

CDMA DEMODULATING APPARATUS

TECHNICAL FIELD

The present invention relates to a code division multiple access (CDMA) demodulating apparatus used for receiving signals of a CDMA system using spread spectrum, and more specifically to a CDMA demodulating apparatus suitable for a mobile communication system which uses a cellular configuration.

BACKGROUND ART

DS (Direct Sequence)—CDMA is a system in which a plurality of users carry out communications using a same frequency band, and each user is identified by a spreading code. As a spreading code for each user, a spreading code such as Gold code is used. Interference signal power of another user is a reciprocal of average spreading factor (PG) in the despreading process of a receiver. However, each user, especially under asynchronous environment in ascendant mobile communications, is subject to momentary variation, short section variation, and distance variation due to independent fading.

Therefore, to satisfy a predetermined reception quality determined by the system by each user at the receiving side, it is necessary to control the transmission power to achieve a constant SIR (Signal-to-Interference Ratio) in the receiver input at the base station. Here, SIR is a ratio of the reception signal power at the user of the desired wave to the interference signal power received from another user. However, even though the transmission power control is perfect, and the SIR in the base station receiver input is maintained at a constant value, under multipath environment of mobile communications, spreading codes will never quadrate completely with each other. Therefore, the user is subject to interference due to cross-correlation of the power of a reciprocal of spreading factor at an average per one of other users.

As shown above, since the interference signal level increases with increasing number of users communicating in the same frequency band, to increase the user capacity per cell, an interference canceling technique to reduce interference from other users is required.

As interference canceling techniques, a multi-user type interference canceler and a single user type interference canceler are known. The multi-user type interference canceler not only demodulates a desired wave signal of its own channel, but also demodulates a signal of another user using spreading code information and reception signal timing of the other user. The single user type interference canceler, on the other hand, uses only the spreading code of own channel to minimize an average cross-correlation and noise component from the other user.

The multi-user type canceler includes a linear processing type (decorrelator or the like) and a nonlinear processing type. The decorrelator calculates mutual correlation of the spreading code of own channel and all other spreading codes of receiver input to determine an inverse matrix composed of the cross-correlation, and the cross-correlation is canceled by compensating for the output signal of a matched filter using this inverse matrix. Where K is a number of users, and Lk is a number of reception paths to individual users, dimension Dm of the decorrelator matrix is given by the following equation.

$$Dm = (2M+1) \times \sum_{k=1}^{K} Lk \quad \text{[Equation]}$$

Therefore, realization of the above technique becomes difficult as the number of users increases, which increases the circuit scale.

A nonlinear multi-user type interference canceler is a replica reproduction type interference canceler. This canceler demodulates interference signal from other user's channel, decides it to reproduce transmission information data replica, calculates an interference signal replica of each channel from this replica, and subtracts the interference replica from the reception signal, thereby demodulating the desired wave signal with enhanced SIR.

FIG. 1 shows a replica reproduction type multi-stage interference canceler (serial interference canceler) proposed in the document "Serial interference cancellation method for CDMA", IEE, Electronics Letters Vol. 30, No. 19, pp. 1581–1582, Sept. 1994.

In FIG. 1, the numeral 11 indicates a spread signal, 12, 16 are delay units, 13, 17 are matched filters, 14, 18 are respreaders, and 15 is a interference subtractor. The serial canceler comprises interference canceling blocks in a plurality of stages, connected in series, whereby the interference canceling blocks of individual stages carry out demodulation and generation of interference signal replica by turns to M users to be demodulated.

The receiver first rearranges the reception signals in the order of reception signal level. For explanation, serial numbers from 1 to M are assigned to the rearranged signals, number 1 being assigned to the highest reception signal level. The interference canceling block of the first stage makes despreading, demodulation and data decision by the matched filter 13 on the reception signal of number 1, and the resulting reproduction data is referred to as $D_1^{(1)}$. The respreader 14 calculates an interference signal replica $S_1^{(1)}$ of this channel from the reproduction data $D_1^{(1)}$. The interference subtractor 15 subtracts the interference signal replica from a reception signal S passed through the delay unit 16. The matched filter 17 makes despreading, demodulation and data decision on the signal obtained by the subtraction using the spreading code replica of user 2 to obtain a reproduction data $D_2^{(1)}$ of user 2. The matched filter input signal of user 2 is improved in SIR to the extent that the interference signal replica $S_1^{(1)}$ of user 1 is subtracted as compared with direct despreading from the reception signal S.

Similarly, to user 2, an interference signal replica $S_2^{(1)}$ is obtained from the reproduction data. A matched filter input signal of user 3 is obtained by subtracting interference signal replicas of users 1 and 2 from the reception signal S passed through the delay unit. Using this procedure, for subsequent users, the reception SIR can be further enhanced. When despreading the reception signal of M'th user, interference signal replicas $S_1^{(1)}+S_2^{(1)}+\ldots S_{M-1}^{(1)}$ of a total of (M-1) users are subtracted from the reception signal S to produce a signal, thereby considerably improving the SIR over the reception signal S. As a result, demodulated signal of M'th channel is improved in reliability.

Using interference signal replicas $S_1^{(1)}, S_2^{(1)}, \ldots, S_{M-1}^{(1)}$ of individual users estimated in the first stage interference canceling block, similar despreading, demodulation, data decision, and respreading are carried out in the second stage interference canceling block. For user 1, interference signal replicas $S_2^{(1)}+S_3^{(1)}+\ldots +S_M^{(1)}$ other than of user 1 determined by the first stage interference canceling block are subtracted from the reception signal S to produce a signal of improved SIR, and on this signal, despreading, demodulation and data decision are carried out. To other channels, similar processing is applied. That is, a signal, obtained by subtracting interference signal replicas in the first stage of channels other than own channel from the reception signal S, is subjected to respreading, demodulation, and data decision, and from the reproduction data, interference signal replicas $S_1^{(2)}, S_2^{(2)}, \ldots, S_M^{(2)}$ of individual channels in the second stage interference canceling block are determined.

Accuracy of the interference signal replicas in the second stage interference signal canceling block is improved compared with the interference signal replicas in the previous stage. This is because data reproduction is made based on the signal obtained by subtraction of interference signal replicas in the previous stage. By repeating serial interference cancellation in several stages, reliability of the reproduction data can be improved even further.

Under mobile communication environment, amplitude variation and phase variation occur due to Rayleigh fading in association with variation in relative positions between the mobile station and base station. In the multi-stage type interference canceler (serial interference canceler) shown in FIG. 1, it is necessary to estimate the phase and amplitude variations in the process of generating the interference signal replicas. The channel (phase; amplitude) estimation accuracy greatly affects the reception characteristics of the multi-stage type interference canceler, but realizability thereof is not described in the above document. As a method in which estimation of transmission path variation under mobile communication environment is added to the serial interference canceler of the above document, there is another document: Fukazawa et al., "Construction and characteristics of interference canceler according to transmission path estimation using a pilot signal", Proceedings of the Electronic Information Communication Society, Vol. J77-B-II No. 11, pp. 628–640, Nov. 1994.

FIGS. 2A and 2B are block diagrams showing a serial canceler shown in this document. FIG. 3 shows the channel structure of the method.

In FIGS. 2A and 2B, the numeral 21 indicates a spreading code input terminal, 22 is a first stage reproduction data output terminal of user 1, 23 is a delay unit, 24 is a pilot channel transmission path variation estimator, 25 is an interference subtractor, 26 is a first stage interference canceling block, 27 is a second stage interference canceling block, 28 is a matched filter, 29 is a transmission path compensator, 30 is a RAKE combiner, 31 is data decision block, 32 is a signal distributor, 33 is a transmission path variation adder, and 34 is a respreader.

This system, as shown in FIG. 3, is provided with a pilot channel having a known transmission pattern parallel with the communication channel. Transmission path estimation is made based on the reception phase of the pilot channel. Further, amplitude/phase estimation of the reception signal of each path of each user is carried out based on the transmission path estimation of the pilot channel. Still further, using the amplitude/phase estimation value, interference canceling of several stages is carried out by the serial interference canceling block to reproduce data of each user. In this case, as in the previous document, individual paths are ranked in the decreasing order of the sum of reception signal power. In the case of FIGS. 2A and 2B, the user 1 reception signal power is assumed as to be the highest.

In the first stage interference canceling block, demodulation is first carried out on user 1. That is, each path of user 1 is despread by a matched filter 28, in a transmission path variation compensator 29, each path of user 1 is compensated for phase variation according to the phase variation of each path estimated with respect to the pilot channel. Further, in the RAKE combiner 30, signals of the phase variation compensated paths are phase synthesized by a reception complex envelope curve of individual paths. The phase synthesized signal is decided by the data decision block 31 to obtain reproduction data of user 1. The distributor 32 distributes the reproduction data replica according to weighting at the RAKE combining, the transmission path variation adder 33 gives a phase variation of each path, and the respreader 34 makes respreading by spreading code of each path to produce the interference signal replica $S_1^{(1)}$.

For user 2, the following processing is made. First, a delay unit 35 delays the reception signal S. The interference subtractor 25 subtracts the interference signal replica $S_1^{(1)}$ of user 1 from the delayed signal. The first stage interference canceling block of user 2 carries out despreading, phase compensation, RAKE combining, data decision, and production of interference signal replica for each path to the output signal of the interference subtractor 25. In this case, the input signal of the interference signal canceling block of user 2 is improved in reception SIR to the extent that the user 1 interference signal replicas are subtracted. Similarly, reproduction data is estimated for each user by the first stage interference canceling block up to user M to obtain interference signal replicas.

The interference signal canceling block of second stage carries out similar processing using interference signal replicas $S_1^{(1)}, S_2^{(1)}, \ldots, S_M^{(1)}$ obtained by the interference signal canceling block of the first stage. For example, the second stage interference signal canceling block 27 (comprising the components 28–34 of the first stage) of user 1 makes data demodulation by despreading the signal obtained by subtracting the channel interference signal replicas other than own channel from the reception signal S delayed by delay unit 23.

A difference of the prior art method from the method described in the previous document is the following point. In the previous method, for user 2, for example, interference signal replicas $S_1^{(1)}+S_3^{(1)}+\ldots+S_M^{(1)}$ in the foregoing stage are used as interference signal replicas of all paths. On the other hand, in the method of this document, $S_1^{(2)}$ is used as an interference signal replica of user 1 in the second stage. Compared with the estimated value $S_1^{(1)}$ in the foregoing stage, the estimated value $S_1^{(2)}$ in this stage is higher in reliability. Therefore, the accuracy of the desired wave signal obtained by subtracting the interference replicas and reliability of decision data obtained by demodulation are also improved.

However, in this method, a pilot channel is provided in parallel with the communication channel for each user, and a channel estimated in the pilot channel is used in each stage of interference canceling block. In this case, since channel estimation in the pilot channel is carried out independent of the interference canceling loop, to estimate channel (phase, amplitude) variation in high accuracy, it has been necessary to make averaging over a very long time (using many pilot symbols). For averaging using such numerous pilot symbols, it is assumed that channel estimation values in this period be approximately constant, therefore, it is limited to be applied to an environment of fast channel variation (high fading frequency). When fading is fast, averaging is possible only in a range where the values can be regarded as constant, it is therefore impossible to obtain a sufficient channel estimation accuracy if the number of averaging symbols is small.

DISCLOSURE OF THE INVENTION

An object of the present invention is to provide a CDMA demodulating apparatus, which can improve reliability of reproduction data in a low SIR environment with a number of simultaneous users.

In a first aspect of the present invention, there is provided a CDMA (Code Division Multiple Access) demodulating apparatus for use in a CDMA communication system that performs spreading information data by a spreading code faster than an information rate to a wideband signal and the wideband signal is transmitted to achieve multiple access transmission, wherein a pilot symbol of know pattern is received to estimate channel variation, individual reception signals received through a plurality of channels are compensated by the estimated channel variation, and the compensated reception signal is demodulated to reproduce the information data, comprising:

a correlation detector using a spreading code as a spreading code replica synchronized with a reception timing of each path of each of the channel for correlation detection of the spreading code replica with the reception signal of each path;

a received level detector for determining a sum of a reception power of a corresponding path of the correlation detector and detecting a desired wave reception signal level;

a channel ranking unit for controlling order of demodulation of the user according to the reception signal level of each user detected by the received level detector; and an interference canceler of a plurality of stages for making interference canceling according to a control signal outputted from the channel ranking unit, in each of the plurality of stages, making estimation of channel variation using the pilot symbol on each channel, compensating the reception signal of the channel by the estimated channel variation, and respreading the compensated reception signal to produce an interference signal replica.

In the CDMA demodulating apparatus, the interference canceler of an i'th (i being an integer of 2 or more) stage of the plurality of stages may use the interference signal replica of each user estimated by the interference canceler of the (i-1)th stage as an input to supply the interference signal replica of each user estimated by the interference canceler of the i'th stage to the interference canceler of a (i+1)'th stage.

In the CDMA demodulating apparatus, each of the interference canceler of each stage may comprise a sub-interference canceler for each user for producing the interference signal replica, the sub-interference canceler of a k'th (k=any of 1, 2, ..., M) user of the interference canceler of the i'th stage comprising:

an interference subtractor for subtracting interference signal replicas in the interference canceler of the i'th stage as interference signal replicas of first, second ... and (k-1)th users from the reception signal, subtracting interference signal replicas in the interference canceler of an (i-i)'th stage as interference replicas of (k+1)'th, ... (M-1)'th and M'th users from the reception signal;

a channel variation estimator for estimating a channel variation of the pilot symbol in the output signal of the interference subtractor for each path, and estimating the channel variation by interpolating the channel variation of the estimated pilot symbol into a position of each symbol of the information data in the output signal of the interference subtractor;

a channel variation compensator for compensating the reception signal for the channel variation estimated for each path by the channel variation estimator;

a RAKE combiner for synthesizing the reception signal of each path outputted from the channel variation compensator;

a data decision block for deciding the output signal of the RAKE combiner;

a channel variation adder for adding a channel variation obtained as an output of the channel variation estimator to the decision data outputted from the data decision block;

a respreader for spreading a signal of each path outputted from the channel variation adder by a spreading code synchronized with reception timing of each path; and an adder for adding the output of the respreader to produce an interference signal replica of the k'th user.

In the CDMA demodulating apparatus, the correlation detector may comprise a plurality of matched filters.

In the CDMA demodulating apparatus, the correlation detector may comprise a plurality of sliding correlators.

In the CDMA demodulating apparatus, the pilot symbol may be inserted periodically between the information data.

In the CDMA demodulating apparatus, the interference canceler of each stage may comprise one unit of the sub-interference canceler, and memories for storing interference replicas of individual users of individual stages, using the sub-interference canceler in time division.

In the CDMA demodulating apparatus, the interference canceler may use a block as a processing unit a block of constant time including at least two adjacent pilot signal sections, and the sub-interference canceler may further comprise an extrapolating unit for an information symbol outside the pilot signal section for extrapolating the pilot symbol closest to the information symbol to determine channel variation of the information symbol.

In the CDMA demodulating apparatus, a subtractor for subtracting an interference signal replica other than of a j'th path of the k'th communicator in an (i-1)'th stage from the output signal of the interference subtractor may be provided at the input side of the correlation detector of the j'th (j being 1 to a path number Lk of RAKE combining) of the k'th user of the i'th (i being an integer of 2 or more) stage interference canceler.

In the CDMA demodulating apparatus, the sub-interference canceler may further comprise:

a reception signal power detector for detecting a power of the reception signal of each path after despreading outputted from the correlation detector;

an adder for adding the reception signal powers of the individual paths;

an amplitude converter for detecting amplitudes of in-phase component and quadrature component from the output of the adder;

an averaging unit for averaging the output signal of the amplitude converter; and a multiplier for multiplying the decision data by an output of the averaging unit.

In the CDMA demodulating apparatus, the interference canceler of the first stage may comprise a decorrelation filter for using a signal of each path of K'th (K being an integer of 2 to spreading factor PG) user from the higher reception signal level to obtain a despread output vector which is interference removed each other;

and a coherent detector/interference generator for estimating transmission data of K users outputted from the decorrelation filter and generating an estimated interference amount of each user, wherein the interference canceler uses the interference signal replica outputted from the coherent detector/interference generator as interference signal replicas of the K users to produce individual interference signals replicas of the remaining (M-K) users.

In the CDMA demodulating apparatus, the interference canceler of i'th (i being an integer of 2 or more) stage of the plurality of stages may use the interference signal replica of each user estimated by the interference canceler of the (i−1)'th stage as an input and supply the interference canceler of (i+1)'th stage with an estimated interference amount of each user estimated by the interference canceler of the i'th stage.

In the CDMA demodulating apparatus, the first stage interference canceler may comprise a sub-interference canceler for producing the estimated interference amount for each user of (K+1)'th user and after, and the sub-interference canceler of a k'th (k=(K+1), (K+2), . . . , or M) user may comprise:

- an interference subtractor for subtracting interference signal replicas in the interference canceler of the i'th stage as interference signal replicas as estimated interference amounts of first, second . . . and K'th th users from the reception signal, and subtracting interference signal replicas in the interference canceler of the first stage as interference replicas of (K+1), . . . (k−1)'th users from the reception signal;
- a channel variation estimator for estimating a channel variation of the pilot symbol in the output signal of the interference subtractor for each path, and estimating the channel variation of each information symbol by interpolating the channel variation of the estimated pilot symbol into a position of each symbol of the information data in the output signal of the interference subtractor;
- a channel variation compensator for compensating the reception signal for the channel variation estimated for each path by the channel variation estimator;
- a RAKE combiner for synthesizing the reception signal of each path outputted from the channel variation compensator;
- a data decision block for deciding the output signal of the RAKE combiner;
- a channel variation adder for adding a channel variation obtained as an output of the channel variation estimator to the decision data outputted from the data decision block;
- a respreader for spreading a signal of each path outputted from the channel variation adder by a spreading code synchronized with reception timing of each path; and
- an adder for adding the output of the respreader to produce an interference signal replica of the k'th user.

Each of the interference canceler of the second stage and after may comprise a sub-interference canceler for each user for producing the interference signal replica , the sub-interference canceler of a k'th (k=any of 1, 2, . . . , M) user of the interference canceler of the i'th stage comprising:

- an interference subtractor for subtracting interference signal replicas in the interference canceler of the i'th stage as interference signal replicas of first, second . . . and (k−1)th users from the reception signal, and subtracting interference signal replicas in the interference canceler of an (i−1)'th stage as interference replicas of (k+1)'th, . . . (M−1)'th and M'th users from the reception signal;
- a channel variation estimator for estimating a channel variation of the pilot symbol in the output signal of the interference subtractor for each path, and estimating the channel variation of the information symbol by interpolating the channel variation of the estimated pilot symbol into a position of each symbol of the information data in the output signal of the interference subtractor;
- a channel variation compensator for compensating the reception signal for the channel variation estimated for each path by the channel variation estimator;
- a RAKE combiner for synthesizing the reception signal of each path outputted from the channel variation compensator;
- a data decision block for deciding the output signal of the RAKE combiner;
- a channel variation adder for adding a channel variation obtained as an output of the channel variation estimator to the decision data outputted from the data decision block;
- a respreader for spreading a signal of each path outputted from the channel variation adder by a spreading code synchronized with reception timing of each path; and
- an adder for adding the output of the respreader to produce an interference signal replica of the k'th user.

In the CDMA demodulating apparatus, the correlation detector may comprise a plurality of matched filters.

In the CDMA demodulating apparatus, the correlation detector may comprise a plurality of sliding correlators.

In the CDMA demodulating apparatus, the pilot symbol may be inserted periodically between the information data.

In the CDMA demodulating apparatus, the interference canceler of each stage may comprise one unit of the sub-interference canceler, and memories for storing interference replicas of individual users of individual stages, using the sub-interference canceler in time division.

In the CDMA demodulating apparatus, the coherent detector/interference generator may comprise:

- a channel variation estimator for estimating a channel variation of the pilot symbol in the output signal of the interference subtractor for each path, and estimating the channel variation of each information symbol by interpolating the channel variation of the estimated pilot symbol into a position of each symbol of the information data in the output signal of the interference subtractor;
- a channel variation compensator for compensating the reception signal for the channel variation estimated for each path by the channel variation estimator;
- a RAKE combiner for synthesizing the reception signal of each path outputted from the channel variation compensator;
- a data decision block for deciding the output signal of the RAKE combiner;
- a channel variation adder for adding a channel variation obtained as an output of the channel variation estimator to the decision data outputted from the data decision block;
- a respreader for spreading a signal of each path outputted from the channel variation adder by a spreading code synchronized with reception timing of each path; and
- an adder for adding the output of the respreader to produce an interference signal replica of the k'th user.

The CDMA demodulating apparatus may further comprise:

an SIR measuring unit for measuring an SIR of the output of the correlation detector;

a reception quality measuring unit for measuring a reception quality of the output signal of the interference canceler;

a target SIR setting unit for setting a target SIR according to the measured reception quality and a required reception quality; and a transmission power control signal generator for comparing SIR outputted from the SIR measuring unit with the target SIR.

In the CDMA demodulating apparatus, the SIR setting unit may set an initial value of the target SIR according to the number of simultaneous communicators.

In the CDMA demodulating apparatus, the reception quality measuring unit may comprise an error ratio measuring unit for measuring a frame error ratio, and means for comparing the frame error ratio with a predetermined threshold value of frame error ratio to decide the reception quality.

In the CDMA demodulating apparatus, the reception quality measuring unit may comprise an error ratio measuring unit for measuring a bit error ratio of the pilot symbol, and means for comparing the bit error ratio with a predetermined threshold value of bit error ratio to decide the reception quality.

In the CDMA demodulating apparatus, the correlation detector may be a matched filter.

In the CDMA demodulating apparatus, the interference canceler may comprise a reception vector generator for generating a reception vector comprising despread signal of each path for each channel from the output signal of the matched filter, a cross-correlation inverse matrix generator for calculating cross-correlation of all spreading codes other than the spreading code of own channel and receiver input to produce an inverse matrix of a matrix comprising cross-correlation, and a matrix vector multiplier for compensating the reception vector by the inverse matrix to remove cross-correlation between individual reception vectors thereby removing interference.

Secondly, according to the present invention, there is provided a CDMA (Code Division Multiple Access) demodulating apparatus for use in a CDMA system that performs multiple access transmission by transmitting a spread signal, the spread signal being generated by spreading information data into a wideband signal with a spreading code whose rate is higher than an information rate, wherein a pilot symbol of a known pattern to estimate a channel variation, each reception signal received through a plurality of channels is compensated by the estimated channel variation, and the compensated reception signal is demodulated to reproduce the information data, the demodulating apparatus comprising:

a correlation detector, using a spreading code in phase with reception timing of each path of each channel, for detecting correlation of the spreading code with the reception signal of each path;

a received level detector for determining a sum of a reception power of a corresponding path of the correlation detector and detecting a desired wave reception signal level;

a channel ranking unit for controlling order of demodulation of the user according to the reception signal level of each user detected by the received level detector;

an interference canceler of a plurality of stages for despreading the reception signal for individual users according to an order determined by the control signal outputted from the channel ranking unit, respreading the despread signal, and subtracting an interference signal replica of other users obtained by respreading from the reception signal of the corresponding user; and a pilot interpolation/coherent detector for estimating a channel variation using the pilot symbol in the signal after subtracting by an interference amount of other users in the interference canceler of the last stage in the plurality of stages, compensating the information data using the estimated channel variation to perform absolute synchronization detection of the compensated information data.

In the CDMA demodulating apparatus, an i'th (i being an integer of 2 or more) stage interference canceler may use the interference signal replica of each user estimated in the (i−1)'th stage interference canceler as an input to supply the interference signal replica estimated in the i'th stage interference canceler to the (i+1)'th stage interference canceler.

In the CDMA demodulating apparatus, each interference canceler of each of the stages comprises a sub-interference canceler for each user for producing the interference signal replica, the sub-interference canceler of a k'th (k=1, 2, . . . , or M) user of the i'th stage interference canceler comprising:

an interference subtractor for subtracting interference signal replicas in the interference canceler of the i'th stage as interference signal replicas of first, second . . . . and (k−1)th users from the reception signal, subtracting interference signal replicas in the interference canceler of an (i−1)'th stage as interference replicas of (k+1)'th, . . . (M−1)'th and M'th users from the reception signal;

a matched filter for making correlation detection between the output signal of the interference subtractor and a spreading code replica in phase with reception timing of each path to obtain a despread signal of each path; and a respreading/combiner unit for spreading the despread signal of each path with a spreading code in phase with the reception timing of each path, estimating an interference signal replica of the path of each user, and adding the estimated interference signal replica to produce an interference signal replica of each user.

In the CDMA demodulating apparatus, the pilot symbol may be inserted periodically between the information data.

In the CDMA demodulating apparatus, the interference canceler of each stage may comprise one unit of the sub-interference canceler, and memories for storing interference replicas of individual users of individual stages, using the sub-interference canceler in time division.

In the present invention, channel variation is estimated using a pilot signal in each channel of each stage. In other words, a channel variation estimator using the pilot signal is included in the interference canceler loop of each channel of each stage. As a result, accuracy of interference signal replica is successively improved in individual stages of the interference canceler, thereby improving the estimated accuracy of each channel. Therefore, the interference canceling effect is improved when there are a large number of users.

Further, for some of users of first stage with low SIR, interference is removed by a decorrelation filter to improve the SIR, and then demodulation is made, thereby improving the accuracy of decision data and interference signal replica. Since subsequent interference cancelers perform interference canceling using the decision data and interference signal replicas, estimation accuracy of channel variation is improved.

For first several users of high ranking with low SIR, interference reduction is made using a decorrelator, and channel estimation is carried out on the interference reduced signal using a pilot symbol, thereby improving the estimation accuracy on the several users.

Yet further, at the receiving side, the communication quality is measured at the output side of the multi-user type interference canceler, the reception quality information is fed back to the SIR threshold value of SIR measurement, and a constant SIR type closed loop transmission power control is performed by the matched filter output signal, thereby achieving transmission power control signal based on SIR of interference reduced signal without increasing delay of control.

BRIEF DESCRIPTION OF THE DRAWINGS

FIGS. 5A and 5B are block diagrams showing a multi-stage interference canceler for the CDMA demodulating apparatus shown in FIG. 4.

FIG. 14 is a block diagram showing an ICU (interference canceling unit) of a k'th user of the multi-stage interference canceler after the second stage in a fourth embodiment of the CDMA demodulating apparatus according to the present invention;

FIG. 15 is a block diagram showing an ICU of the k'th user in a fifth embodiment of the CDMA demodulating apparatus according to the present invention;

FIGS. 16A and 16B are block diagrams showing the first stage interference canceler in a sixth embodiment of the CDMA demodulating apparatus according to the present invention;

FIGS. 17A and 17B are block diagram s showing the multi-stage interference canceler in a seventh embodiment of the CDMA demodulating apparatus according to the present invention;

FIGS. 19A and 19B are block diagrams showing the multi-stage interference canceler in the eighth embodiment, in which a portion surrounded by the broken line in FIG. 19B is a modification example of the eighth embodiment;

BEST MODE FOR CARRYING OUT THE INVENTION

Embodiments of the present invention will now be described in detail with reference to the accompanying drawings.

Embodiment 1

Figure 1:
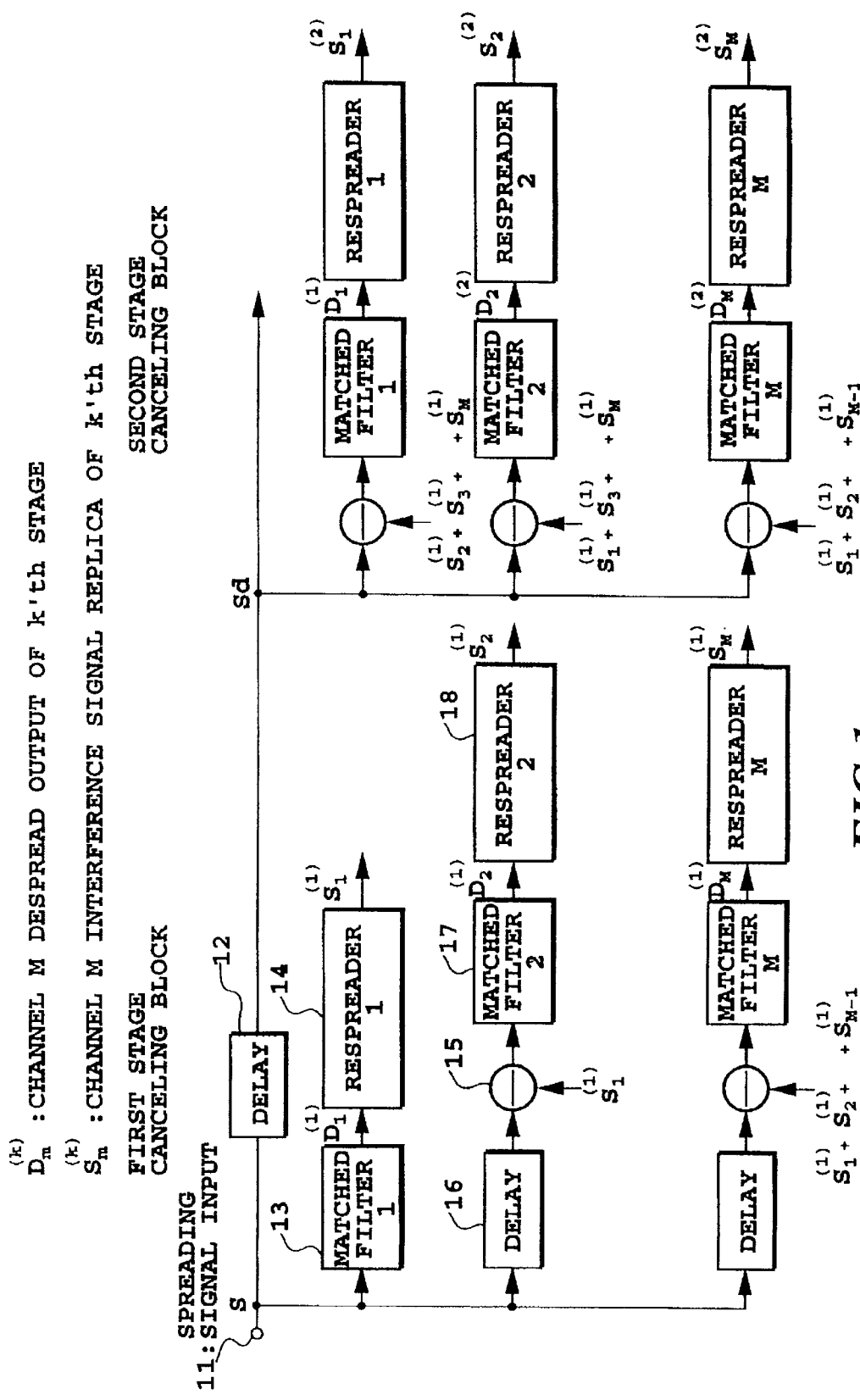
FIG. 1 is a block diagram of showing the structure of a multi-stage interference canceler in a prior art CDMA demodulating apparatus.
Figure 2A:
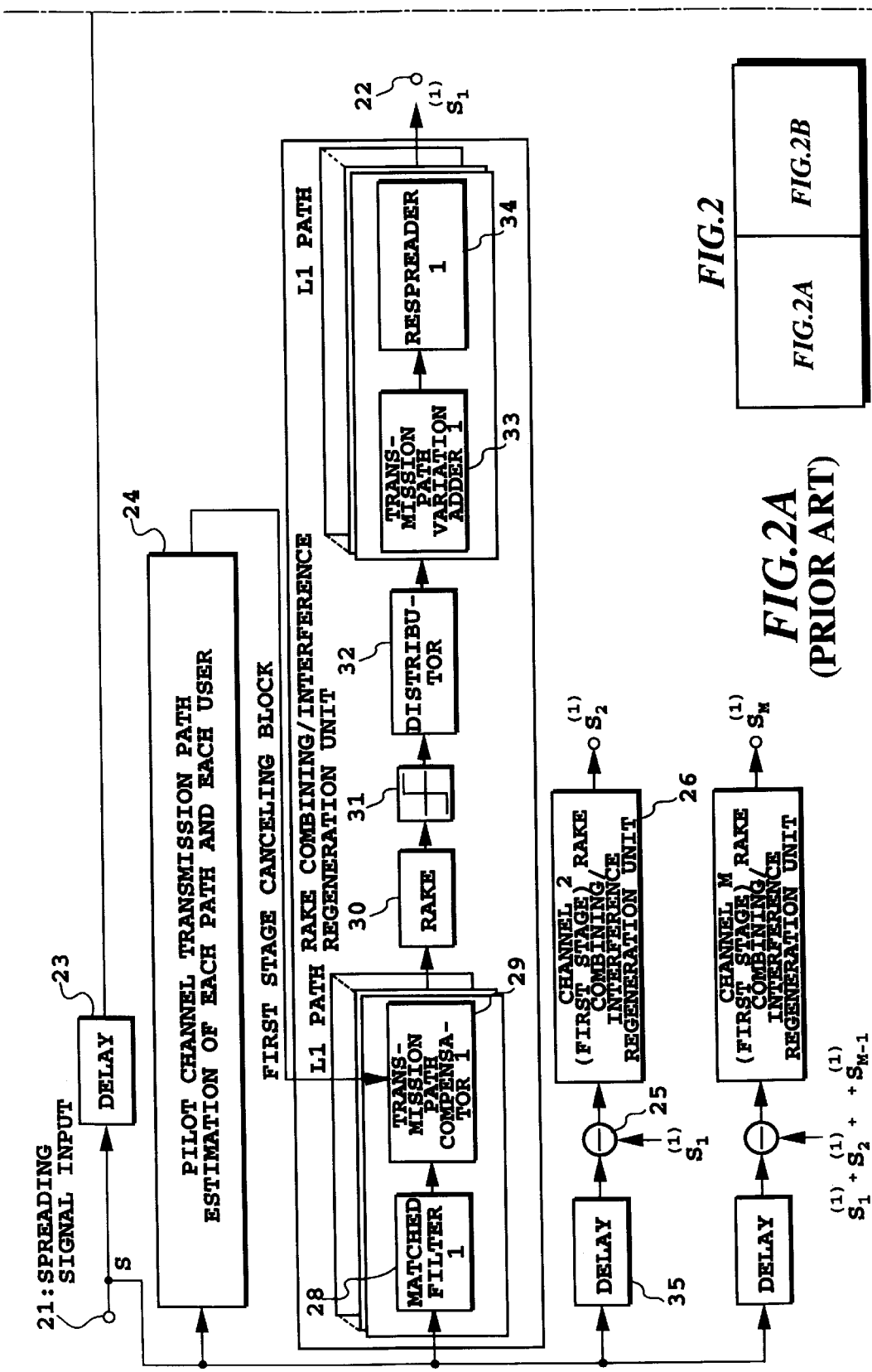
FIGS. 2A and 2B are block diagrams showing the structure of another prior art multi-stage interference canceler.
Figure 2B:
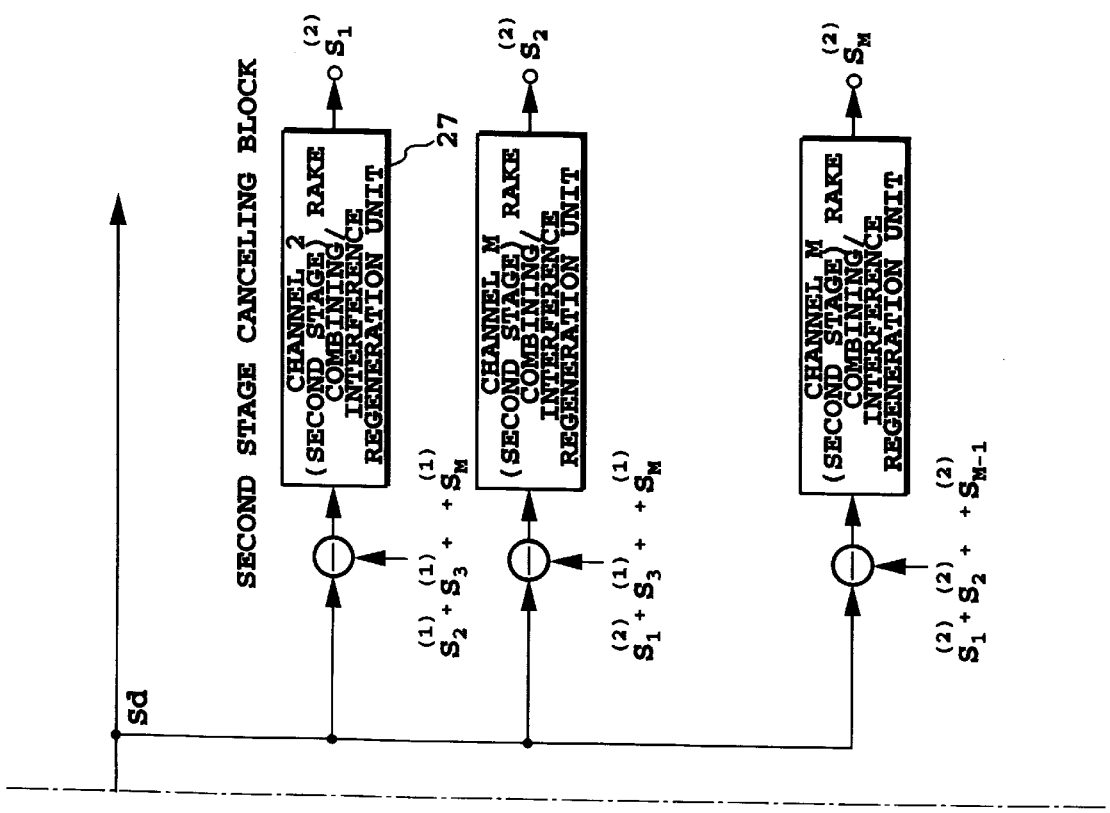
Figure 3:
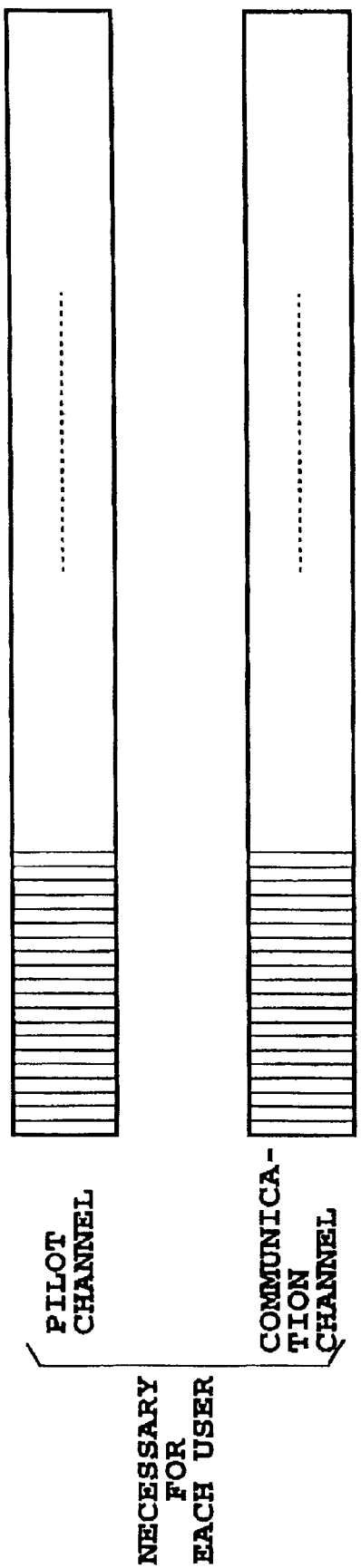
FIG. 3 is a schematic view showing a prior art channel arrangement used in the apparatus of FIGS. 2A and 2B.
Figure 4:
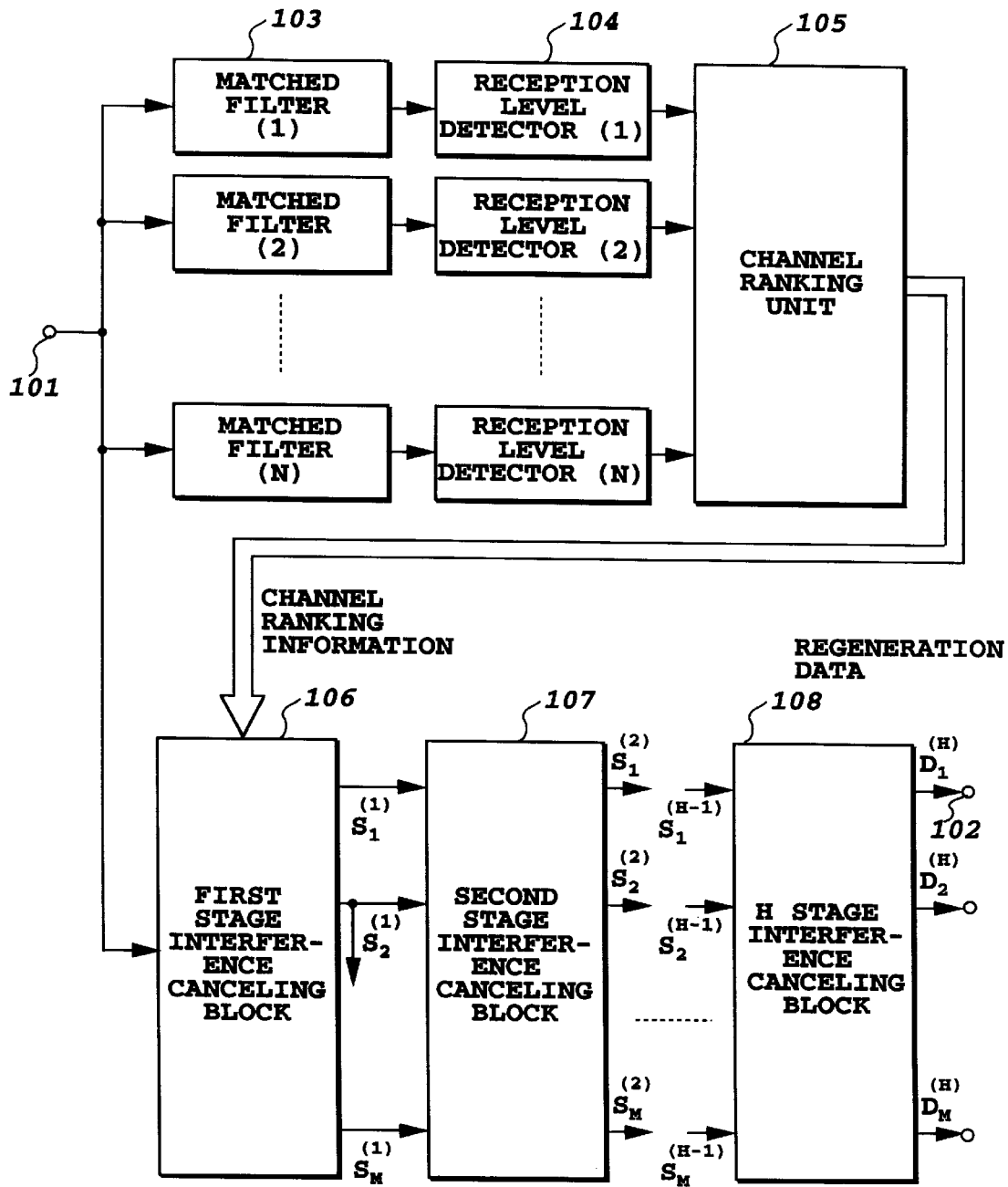
FIG. 4 is a block diagram showing the entire structure of a first embodiment of the CDMA demodulating apparatus according to the present invention.
Figure 5B:
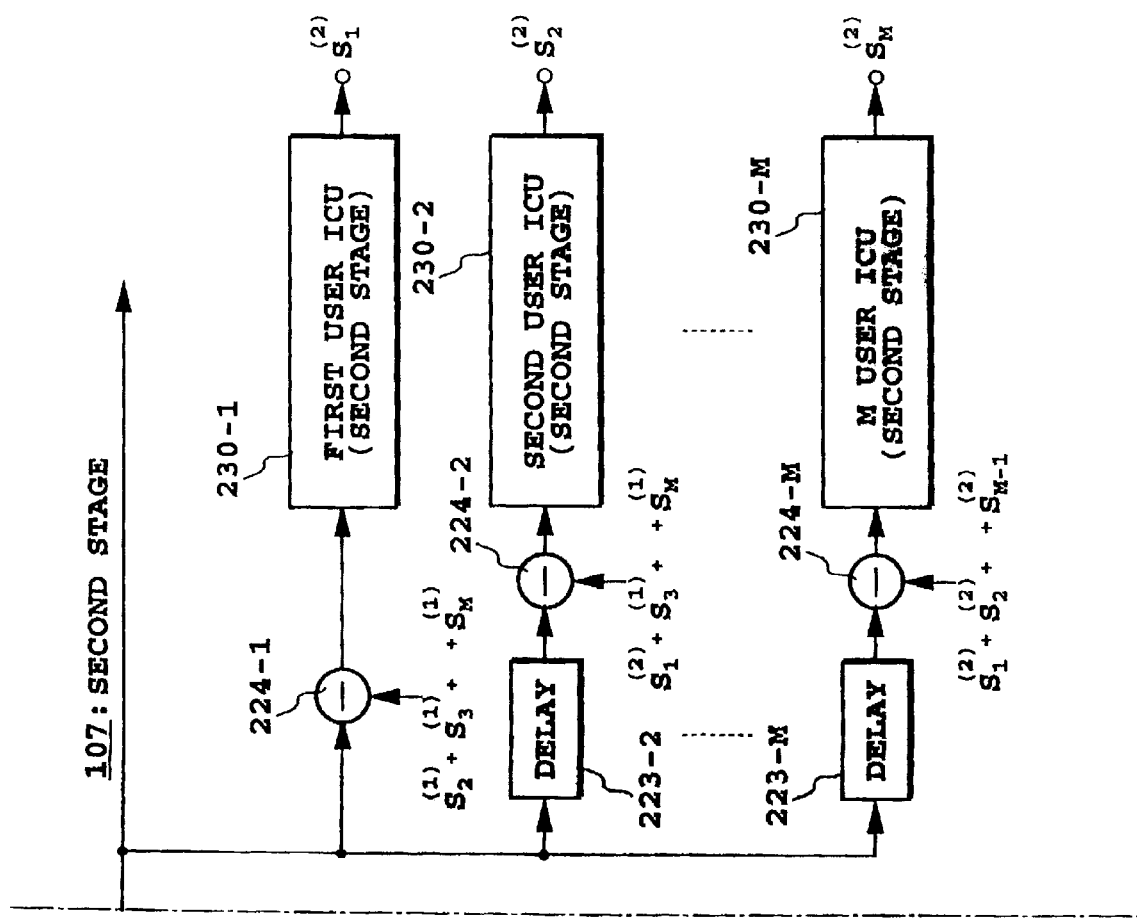
Figure 6:
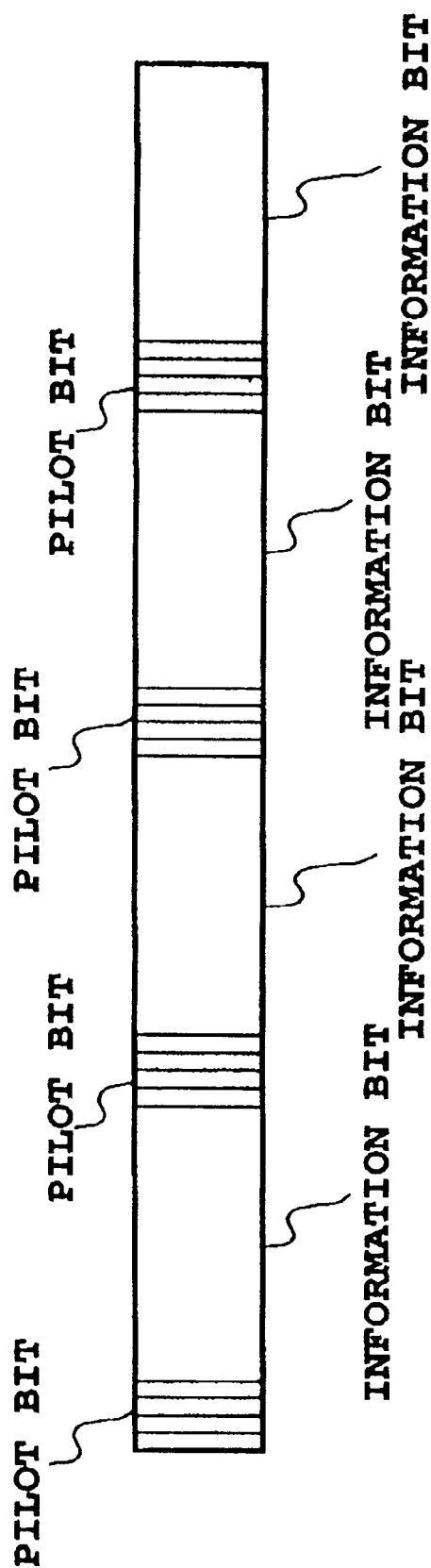
FIG. 6 is a schematic view showing the frame arrangement used in the first embodiment.

FIG. 4 is a block diagram showing the entire construction of the first embodiment of the CDMA demodulating apparatus according to the present invention, FIGS. 5A and 5B are block diagrams showing the construction of interference canceling blocks of the first stage and the second stage of the CDMA demodulating apparatus, and FIG. 6 is a schematic view showing the frame arrangement of the CDMA demodulating apparatus to which the present invention is applied.

The frame of the system to which the present invention is applied, as shown in FIG. 6, has a structure in which pilot signals of a known pattern are inserted periodically between information signals in units of several symbols.

A receiver of the system comprises, as shown in FIG. 4, matched filters 103 and received level detectors 104 provided corresponding to channels 1–N, a channel ranking unit 105, and interference canceling blocks 106–108 of first–H'th stages. The matched filter 103, in each path of each channel, performs correlation detection of the spreading code replica with the reception signal using the spreading code in phase with the reception timing as a spreading code replica. The received level detector 104 makes a sum of reception power of individual paths outputted from the matched filters 103 to detect the received level of a desired wave. The channel ranking unit 105 outputs a channel ranking information for controlling the order of demodulation of users of the receiver input according to the reception signal level of each user. The interference canceling blocks 106–108 perform demodulation in the order of higher received level according to the channel ranking information, and output new interference signal replicas of individual users using interference signal replicas estimated by the interference canceling block of the previous stage.

FIGS. 5A and 5B individually show the constructions of the interference canceling blocks 106 and 107.

A received spread signal S supplied to an input end 201 of the interference canceling block 106 is fed to delay units 202, 203 (203-2–203-M) and an interference canceling unit 210-1 (hereinafter referred to as ICU). Output of the delay unit 202 is fed to the interference canceling block 107 of the second stage. Further, output of each delay unit 203 is fed to each interference subtractor 204 (204-2–204-M). These delay units 203 are for synchronizing processing timing. An interference subtractor 204-$k$ of the k'th user (k=2, . . . , or M) subtracts interference signal replicas in the corresponding interference canceling block of the first, 2nd, . . . (k−1)'th users and interference signal replicas in the interference canceling block of the previous stage of (k−1)'th . . . , (M−1), M'th users from the input signal.

The ICU are provided in the number of users×number of stages. The structure is illustrated using the ICU 210-1 of user 1 of the first stage as an example. The ICU 210-1 comprises a matched filter 211, a pilot symbol channel variation estimator (herein after referred to as PCHE) 212 and a channel variation compensator 213, a RAKE combiner 214, and a data decision block 215 provided in each of multiple paths, a channel variation adding unit 216 and a respreader 217 provided in each path, and an adder 218, and output of the adder 218 (channel variation estimation value) is outputted from an output terminal 219.

The matched filter 211 makes cross-correlation of a received spread signal with a spreading code for each path, and outputs a despread signal. The PCHE 212 estimates a variation in the transmission path of each path of each symbol in the despread signal. That is, for each path, the transmission variation estimated by the pilot symbol is interpolated into the information position in the section to estimate the transmission path variation in each information symbol. The channel variation compensator 213 compensate an estimated phase variation for each path. The RAKE combiner 214 makes weighted combination of output signal of each channel variation compensator 213 according to the magnitude of reception power of each path. The data decision block 215 decides output signal of the RAKE combiner and outputs a decision data. The channel variation adder gives a phase variation outputted from PCHE 212 to the signal of each path outputted from the data decision block 215. The respreader 217 respreads the signal of each path outputted from the channel variation adding unit 216 with a spreading code in phase with the reception timing of each path. The adder 218 calculates the sum of the estimated reception signal of each path of this user to produce a reception signal replica $S_1^{(1)}$ of the user. Since the reception signal replica $S_1^{(1)}$ is an interference to other channels, it can be referred to as an interference signal replica. The interference signal replica $S^{1(1)}$ is fed to the delay unit 204-2 of user 2, and subtracted from the received spread signal S delayed by the delay unit 203-2. Therefore, in the ICU 210-2 of the second user, interference canceling is made on an interference-reduced signal. Other ICUs 210 of this stage have the similar construction. Further, other interference canceling blocks 107 and 108 are also similar in construction.

Operation of the present embodiment will be described. The matched filter 103 despread the receiver input signal using the corresponding spreading code of each path of each user as a replica. The received level detector 104 determines a reception signal power for each user by adding the matched filter correlation output value of multiple paths to be synthesized for each user. The channel ranking unit 105 makes ranking in the order of higher reception signal power level and outputs channel ranking information.

The serial canceling blocks 106–108 carry out demodulation successively from the user of higher ranking. Operation of the interference canceling block 106 of the first stage is as follows.

The ICU 210-1 produces the interference signal replica $S_1^{(1)}$ of user 1. First, the matched filter 211 despreads the received spread signal S for each path. The PCHE 210 interpolates a reception phase in the pilot symbol for each information bit between pilot symbols shown in FIG. 6, to determine a transmission path phase variation of each information symbol.

Figure 7:
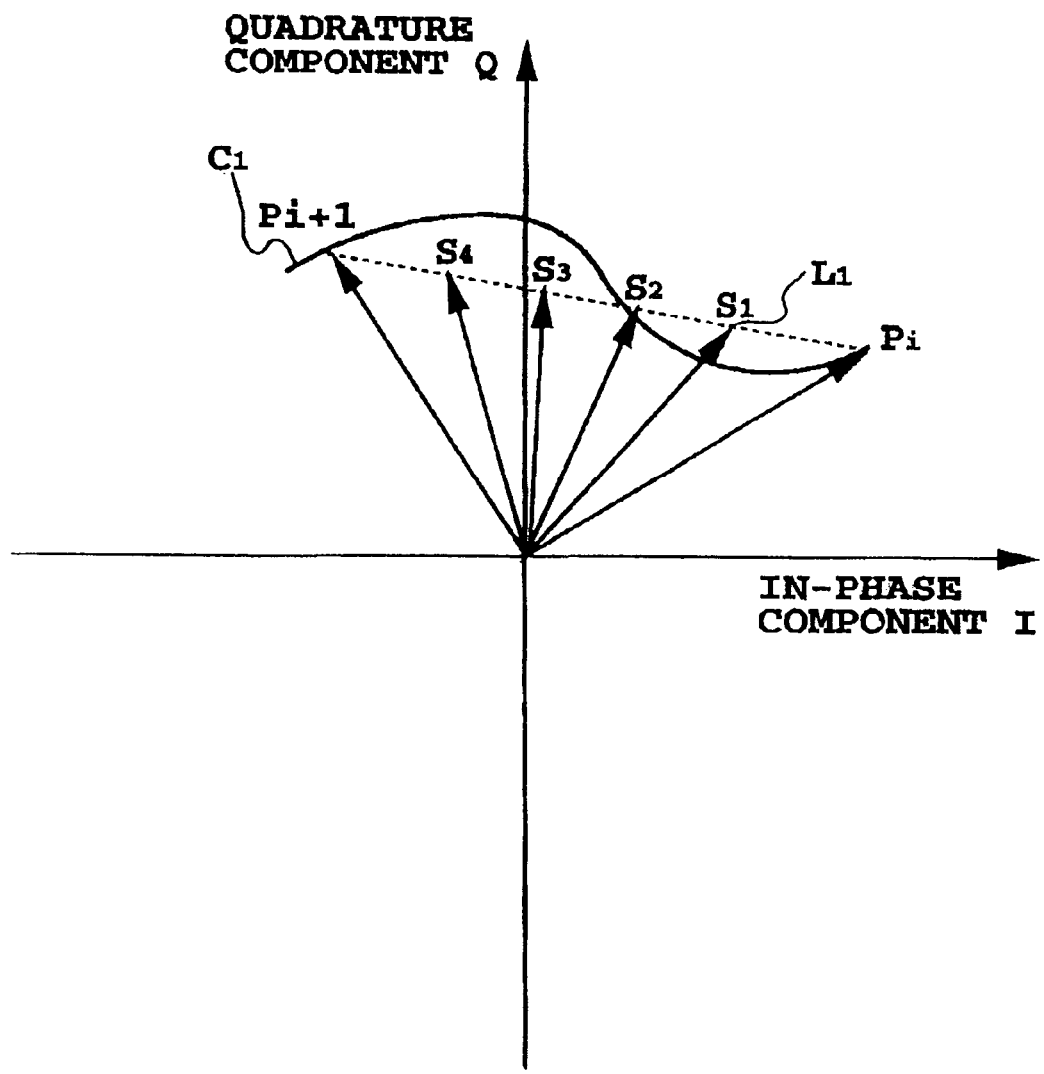
FIG. 7 is a vector diagram for illustrating an information data phase error compensation method using a pilot signal in the first embodiment.

FIG. 7 shows a transmission path variation estimation method of information symbol by interpolation of pilot symbols. The axis of abscissas of FIG. 7 indicates magnitudes of in-phase components of pilot symbol and information symbol, and the axis of ordinates indicates magnitudes of these quadrature components. Pi and Pi+1 indicate reception phase vectors of the pilot symbol determined by averaging in each pilot symbol section. A broken line L1 is a straight line obtained by linear interpolation of the reception phase vectors Pi and Pi+1 in the information symbol section. Vectors S1, S2, . . . indicate reception phase vectors of each information symbol estimated by the interpolation. A curve C1 indicates a locus of actual reception phase vectors of each symbol in association with the transmission path variation. As shown in FIG. 7, the reception phase vector of the information symbol can be estimated by linear interpolation of reception phase vectors in each pilot symbol section to the position of each information symbol in the section. In the present embodiment, such estimation of phase variation by pilot symbol is performed for each path of each user of each stage. The insertion interval of the pilot symbols is determined to follow the phase variation of the transmission path.

The channel variation compensator 213 makes phase compensation of the information symbol using the resulting channel phase variation estimation value. The RAKE combiner 214 RAKE synthesizes phase-compensated signals of each path using the reception power of each path as weighting. The data decision block 215 identifies and decides the RAKE synthesized signal to produce a reproduction data replica. The channel variation adding unit 216 adds an estimated phase variation of each path to the decided data. The respreader 217 respreads the output of the channel variation adding unit 216 using a spreading code in phase with the reception timing of each path to obtain a interference signal replica of each path. The adder 218 determines the sum of interference signal replicas of individual paths to obtain the interference signal replica $S_1^{(1)}$ of user 1.

Next, processing on user 2 will be described. The interference subtractor 204-2 subtracts the interference signal replica $S_1^{(1)}$ of user 1 from the received spread signal S. The ICU 210-2 estimates an interference amount $S_2^{(1)}$ of user 2 same as in ICU 210. In this case, input signal to the ICU 210-2 of user 2 is improved in SIR (Signal-to-Interference ratio) as compared with the received spread signal S. This is because the interference signal replica $S_1^{(1)}$ is subtracted from the reception signal S. Similarly, since the input signal to the ICU of a k'th user is subtracted by interference signal replicas of first to (k−1)'th users, the SIR can be successively enhanced. Thereafter, on each user to M'th user, data demodulation is performed on the signal subtracted by the sum of interference signal replicas up to the immediately previous user.

The second stage interference canceling block 107 carries out demodulation successively from user 1 as in the first stage interference canceling block 106. Specifically, the ICU 230-1 of user 1 determines the interference signal replica of user 1 on the signal subtracted by the sum of interference signal replicas of other users in the first stage, $S_2^{(1)}+S_3^{(1)}+\ldots S_M^{(1)}$ from a reception signal Sd, of which delayed processing is considered, as in the ICU 210-1.

The ICU 230-2 of user 2 of the second stage also makes the same processing on the signal subtracted by the sum of the first user interference signal replica obtained in the second stage and the interference signal replicas from the third user to M'th user, $S_1^{(2)}+S_3^{(1)}+\ldots+S_M^{(1)}$, from the reception signal Sd to determine the interference replica of the 2nd user. Further, the ICU 230-M of M'th user also makes the same processing on the signal subtracted by the sum of interference signal replicas of other users estimated in the second stage, $S_1^{(2)}+S_2^{(2)}+\ldots+S_{M-1}^{(2)}$, from the reception signal Sd to determine the interference signal replica of M'th user.

In other words, k'th user uses the interference signal replica in the corresponding stage on a user of higher ranking (higher in reception signal level) then own, and on the users of lower ranking than own, uses the interference signal replicas produced in the interference canceling block of the previous stage to calculate the interference signal replica.

The point of the present embodiment differing from the prior art is that phase estimation of each path is made for each user of each stage. By this method, the accuracy of the interference signal replica of each user is improved every time one stage of the interference canceling block is passed. As a result, estimation error subtracted by interference signal replicas of other users from the reception signal is reduced, and estimation accuracy of phase variation is also improved.

In the present embodiment, the matched filter is used as despreading means, however, alternatively, sliding correlators of the number of paths can be used to obtain the same characteristics.

Figure 8:
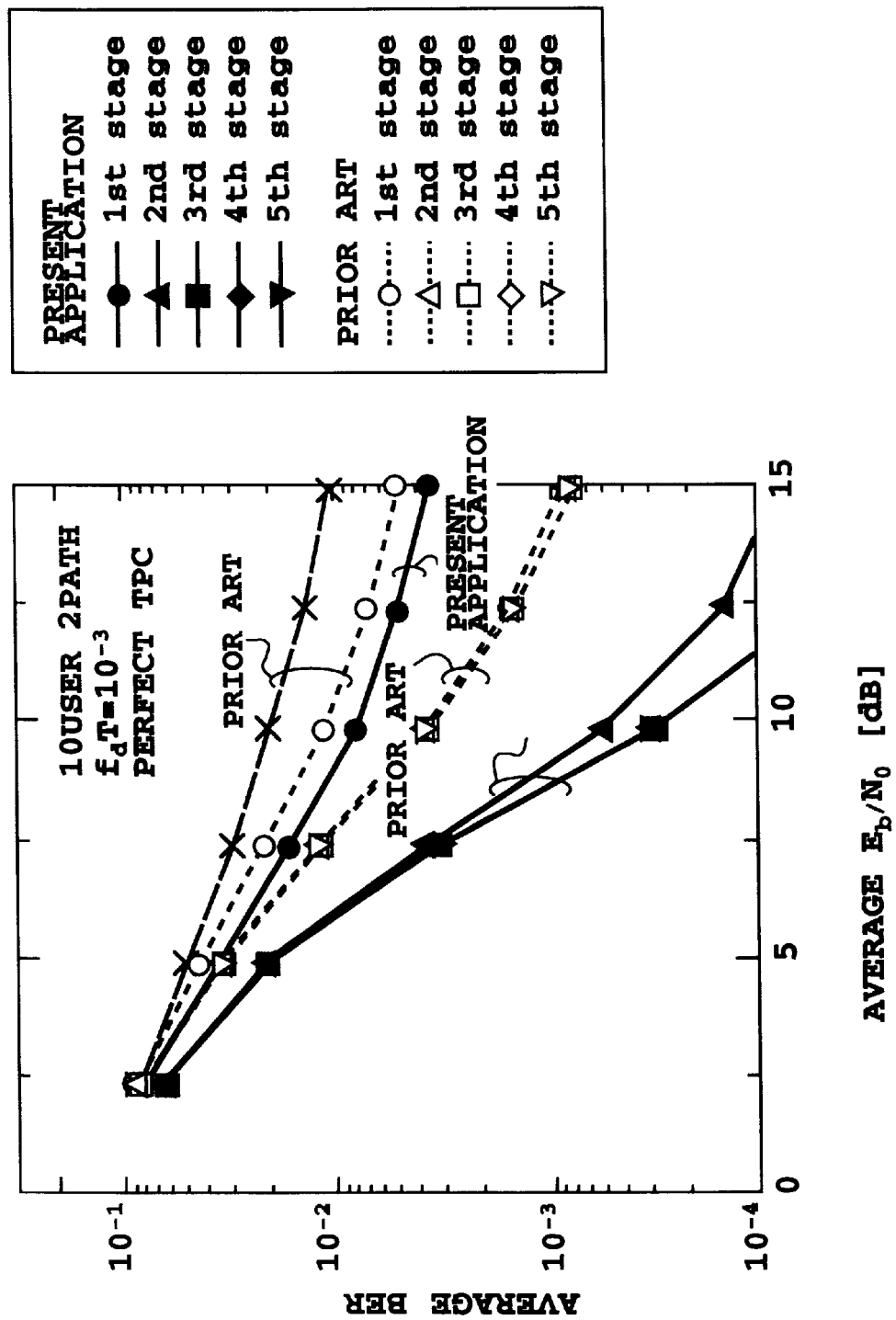
FIGS. 8 and 9 are graphs showing an effect of the multi-stage interference canceler in the first embodiment.

FIG. 8 is a graph showing an average bit error ratio in CDMA demodulating apparatus of the present invention compared with the prior art apparatus. In this graph, the axis of abscissas indicates Eb/No (energy per bit to noise spectral density), and the axis of ordinates indicates the average bit error ratio. In the prior art apparatus, as shown in FIG. 7, that the pilot symbol obtained by despreading is interpolated in the information symbol section to estimate the channel variation is the same as in the present invention. However, whereas in the present invention, channel estimation on each path of each user is successively carried out for each stage of the interference canceling block, the prior art apparatus differs in that it uses the reception vectors obtained in each pilot symbol section of each user commonly for all stages of the interference canceling block.

As can be seen from the graph shown in FIG. 8, the improvement in the error ratio is almost the highest when the interference canceling block is three stages, but almost no increase in effect is noted even if the number of stages is further increased. Further, where Eb/No is 10 dB, the apparatus of the present invention can reduce the error ratio nearly one figure compared with the prior art apparatus.

Figure 9:
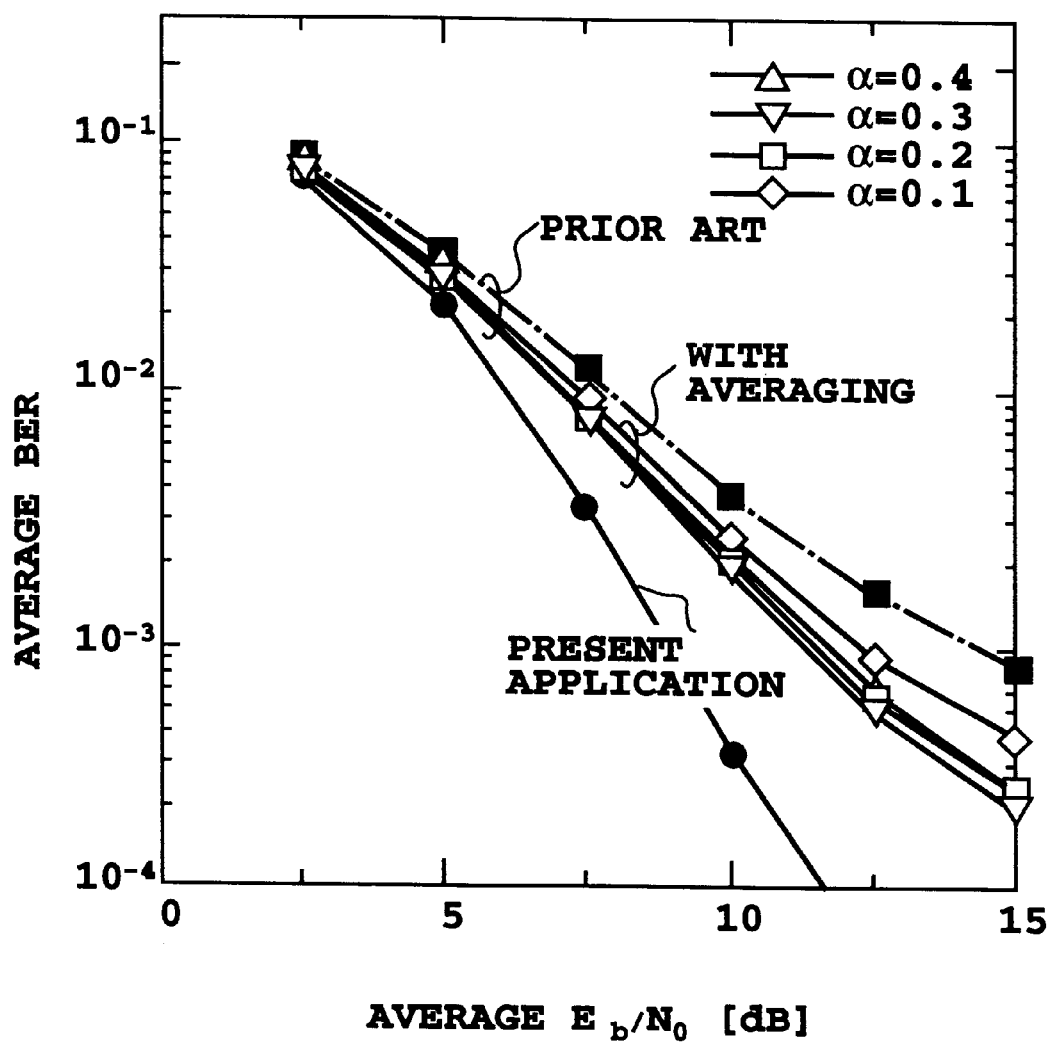

FIG. 9 is a graph comparing the average bit error ratio with a weighted average between the present pilot section and the previous pilot section to make phase estimation of pilot symbol. In the figure, α and (1−α) indicate weighting and black circles indicate the error ratio of the present invention. As can be seen from the figure, for Eb/No in the vicinity of 10 dB, the error ratio of the present invention is about ⅙ the weighted averaging.

Embodiment 2

Figure 10:
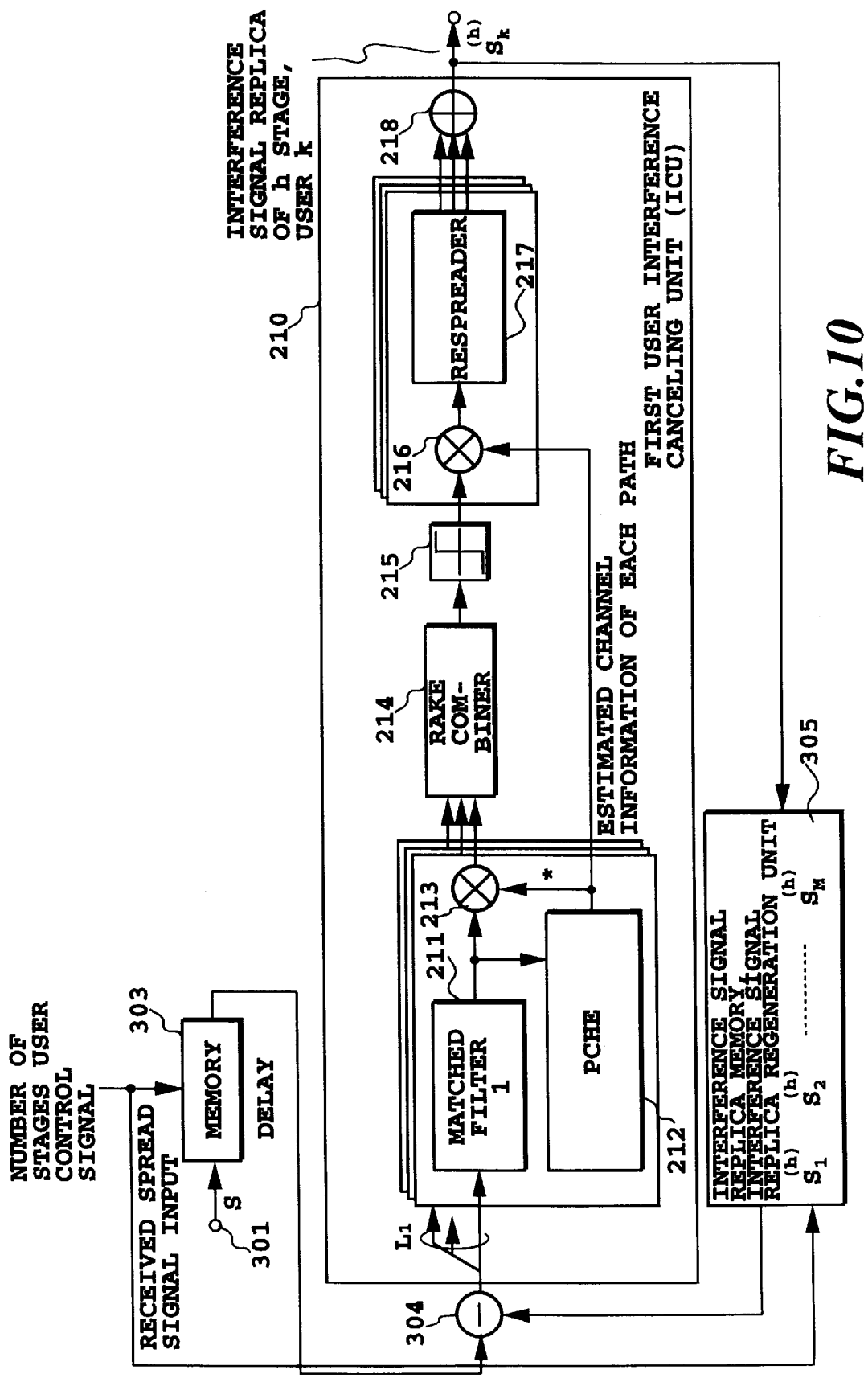
FIG. 10 is a block diagram showing an interference canceler used in a second embodiment of the CDMA demodulating apparatus according to the present invention.

FIG. 10 is a block diagram showing a second embodiment of the interference canceling block of the CDMA demodulating apparatus according to the present invention. A difference of this embodiment from the first embodiment is that processing of all stages for M users is performed by a single ICU. That is, the hardware is simplified by repeatedly using a single ICU in time division.

In FIG. 10, the received spread signal S inputted to an input terminal 301 is fed to a memory 303. The memory 303 functions as a delay unit under control of a user control signal (channel ranking signal) supplied from the channel ranking unit 105. That is, it corresponds to the delay units 202, 203 and 223 in FIG. 5A. Further, an interference subtractor 304 corresponds to the interference subtractor 204 and 224, which subtracts the interference signal replica read from an interference signal replica memory 305 from the spread signal S read from the memory 303. The ICU 310 corresponds to the ICU 210 of FIG. 5A and the ICU 230 of FIG. 5B, which performs channel estimation, RAKE combining, and interference signal replica production on the output of the interference subtractor 304 to output a new interference signal replica. Thus, the ICU 310 successively updates the interference signal replica of each path of each user, and writes the resulting interference signal replica into the interference signal replica memory 305.

Embodiment 3

Figure 11:
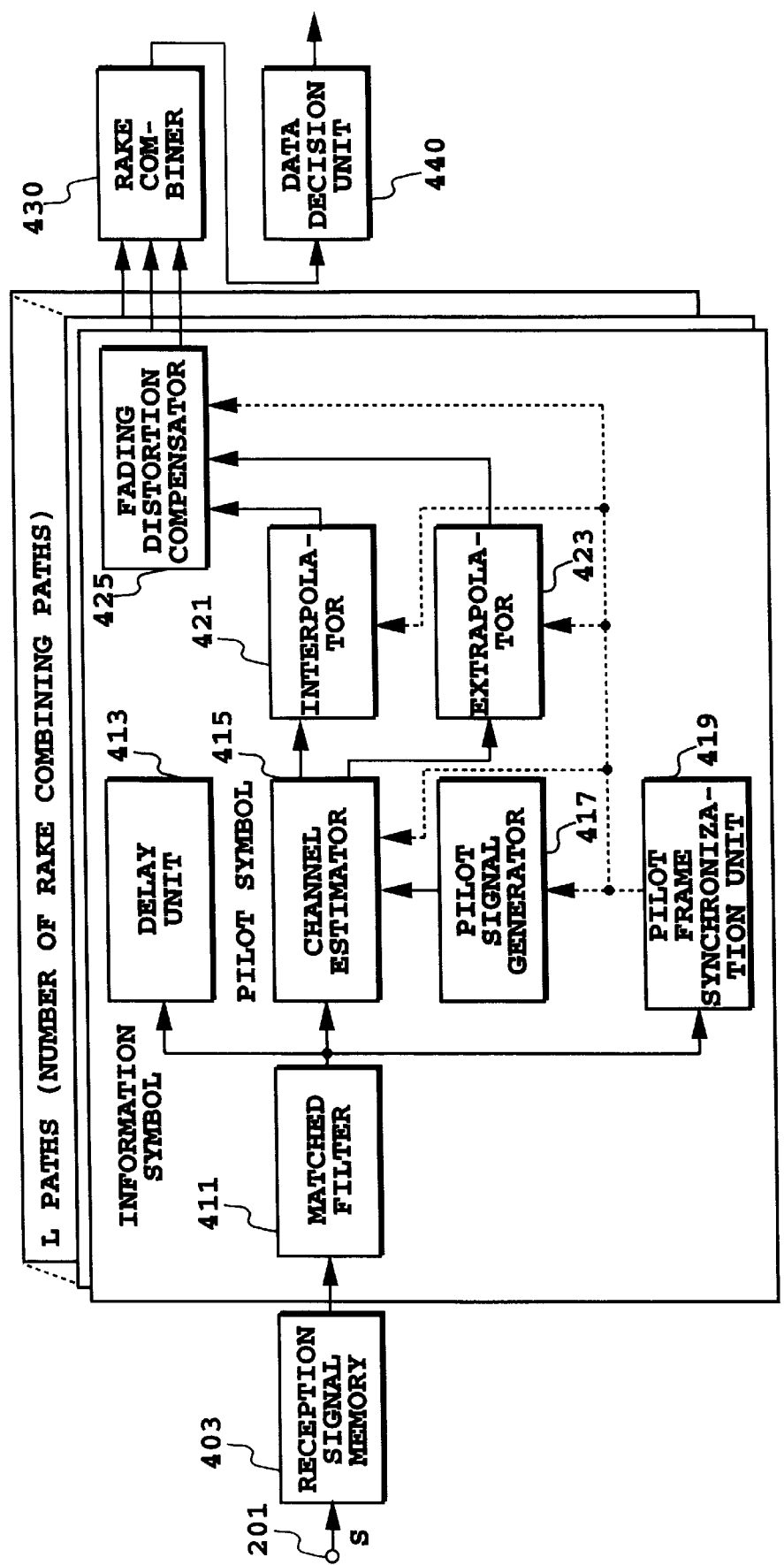
FIG. 11 is a block diagram showing the structure of a channel variation estimator and a channel variation compensator for producing an interference replica of each user in an interference canceler of a third embodiment of the CDMA demodulating apparatus according to the present invention.

FIG. 11 is a block diagram showing the construction of a matched filter in ICU, a PCHE (pilot symbol channel variation estimator) and a channel variation compensator in a third embodiment of the CDMA demodulating apparatus of the present invention. The principle will be described before describing the third embodiment in detail.

In a cellular communication system, in a downward channel from a base station to a mobile station, transmission timing of each user is synchronized with each other. However, since transmission delay differs in an upward channel responding to it, information symbol timing and spreading code chip timing are asynchronous.

Figure 12:
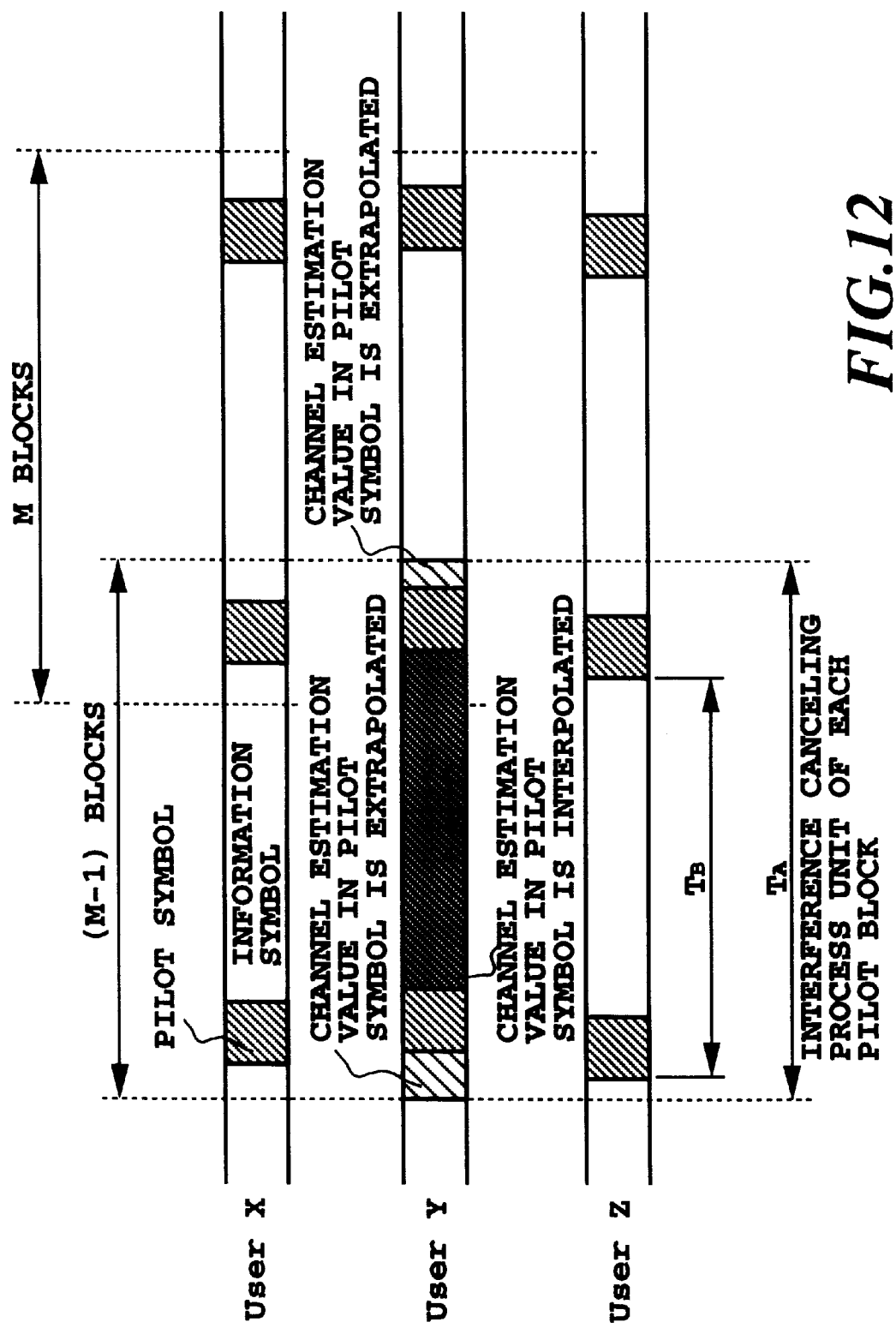
FIG. 12 is a schematic view for illustrating an interference replica generating method in the third embodiment.

FIG. 12 shows a frame-arrangement of each user in an asynchronous channel. As shown in the figure, on the pilot symbol of user X, there is an interference of the information symbol in the previous pilot block of user Y. This is because in the multi-stage interference canceler, an estimation interference replica is produced in a unit of chip. Therefore, multi-stage interference canceling performed in a unit of 1 pilot block is required to be performed in a unit of time including information symbols before and after the pilot block. That is, it is necessary to produce an estimation interference replica in a unit of interference canceling time TA including the information symbols before and after, rather than pilot block time TB as shown in FIG. 12. Therefore, processing such as channel ranking by an average value of reception signal level, production of estimated interference replica, and the like must be performed in every processing time TA.

Figure 13:
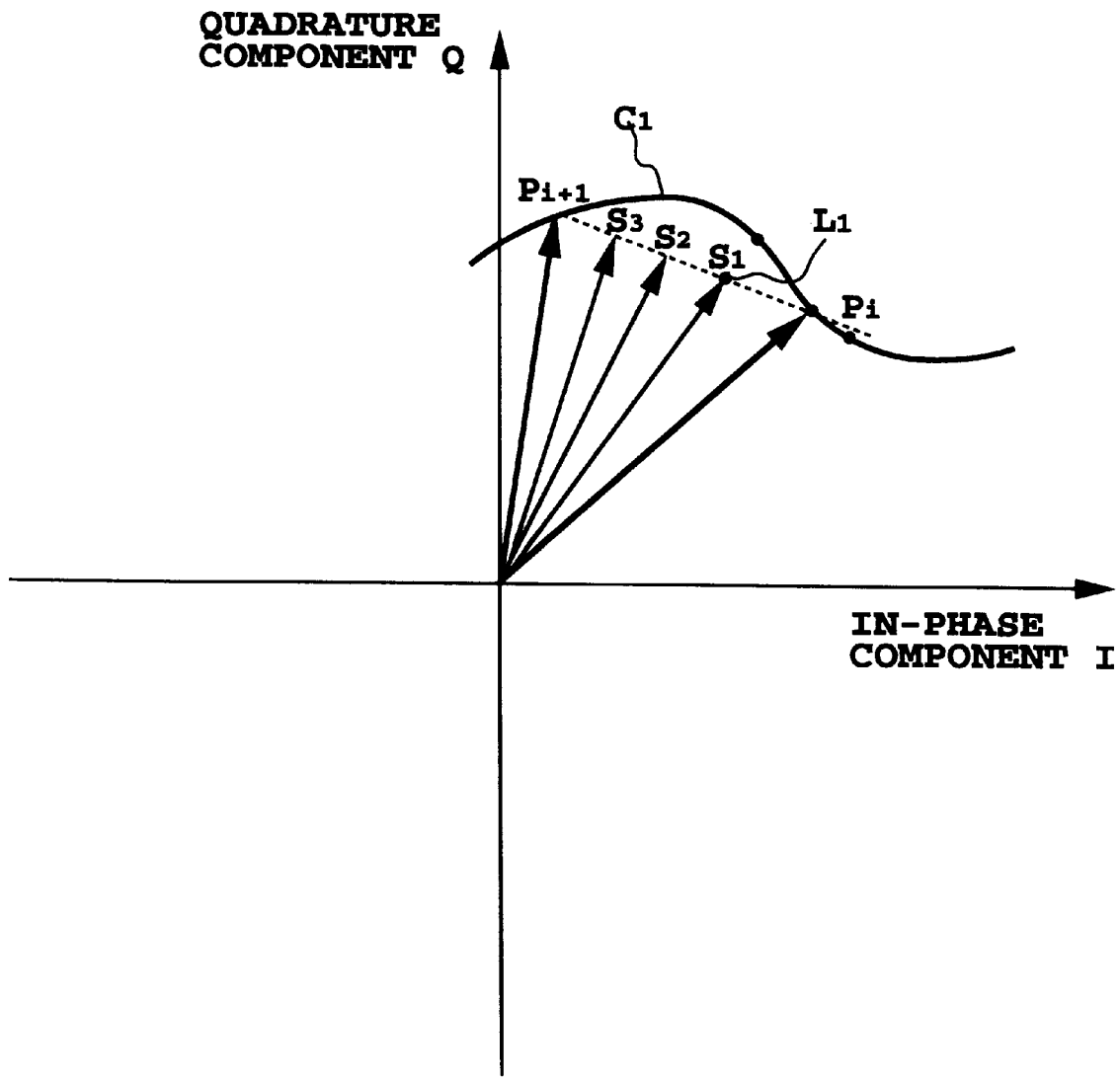
FIG. 13 is a vector diagram for illustrating a channel variation estimation method for generating an interference replica in the third embodiment.

FIG. 13 is a vector diagram showing the principle of channel estimation for the production of interference replica in an asynchronous channel. A difference between the processing in FIGS. 7 and 13 is that the channel variation is estimated by extrapolating a reception envelope line of the pilot symbol for several symbols outside a pilot symbol Pi. Since the number of the outside symbols is several symbols even considering transmission delay, no substantial error is produced even if the channel variation estimation value of the pilot symbol is adopted as a channel estimation value of the information symbol outside the pilot symbol. By using these estimation values, the spread signal replica of the information symbol outside the pilot symbol can be produced. Further, for an information symbol sandwiched between two pilot symbols, variation is estimated by interpolating the pilot symbols in the information symbol section, as in FIG. 7, to produce the spread signal replica of the information symbol. By subtracting these spread signal replicas from the reception signal S to form the multi-user interference canceler even in an upward asynchronous channel. With this method, if only the reception signal in 1 pilot block time TB is stored in the memory, interference replicas can be produced in the range of longer processing time TA, thereby achieving an efficient multi-user interference canceler.

Reverting back to FIG. 11, the construction of the PCHE and channel variation compensator in the ICU of the present embodiment will be described. Other construction is the same as in FIG. 5A.

In FIG. 11, the received spread signal applied to an input terminal 201 is written in a reception signal memory 403. The memory 403 stores the reception signal in 1 pilot block time TB in FIG. 12. The stored reception signal is fed and despread in a matched filter 411. The despread signal is fed to a delay unit 413, a channel estimator 415, and a pilot frame synchronizer 419.

The channel estimator 415 extracts a pilot symbol of known pattern from the despread signal, which is compared with the pilot symbol supplied from a pilot signal generator 417 to estimate the phase variation. In this case, the pilot symbol generation phase of the pilot signal generator 417 is controlled by a signal from the pilot frame synchronizer 419.

The phase variation estimated by the channel estimator 415 is converted to a signal and fed to an interpolator 421 and an extrapolator 423. For an information symbol inside the pilot block, the estimation value estimated in the pilot section of both sides into the position of each information symbol to estimate channel variation of each information symbol. On the other hand, for an information symbol outside the pilot block, the estimation channel variation in the pilot section closest to the information symbol is determined as a channel variation estimation value. As described above, the number of information symbols, even considering transmission delay in a cellular system with a cell radius of several km, is only a few. These channel variation estimation values are fed to a fading distortion compensator 425, multiplied to the despread signal passed through the delay unit 413 to compensate for the channel variation.

The processing is performed on each path of this user, and the channel variation compensated despread signal of each path is fed to a RAKE combiner 430. The RAKE synthesized signal is decided by a data decision block 440.

With the present embodiment, even in an upward asynchronous channel, multi-stage interference canceling is possible by block processing in a unit of constant time. In the present embodiment, since it is not necessary to communicate interference replica information between blocks, the apparatus can be simplified.

Embodiment 4

FIG. 14 is a block diagram showing the ICU of the interference canceler after the second stage of a fourth embodiment of the CDMA demodulating apparatus according to the present invention. The present invention eliminates interference replicas due to multipath signals of own channel.

In mobile communication environment, multipath transmission paths are formed due to reflection from buildings and ground. The multipath signal of own channel, as in the signals from other users, also produces cross-correlation at despreading causing interference. As in the above-described embodiments, in an arrangement where channel estimation is successively performed for each stage using pilot symbols, the input signals of ICU of the stages after the second stage include interference replicas due to multipath signals of own channel.

In a wideband DS-CDMA of high-speed chip rate, due to its low time resolution, the reception signal can be separated to a number of multipath signals, and a RAKE combining function is effective. However, in the RAKE combining, the signal power per 1 path of multipath is reduced, interference from multipath signals of own channel becomes not negligible. Therefore, in the multi-stage interference canceler, it is necessary to use the signal subtracted not only by interference replicas of other users but also by interference replicas due to multipath signals of own channel as an ICU input signal to improve SIR even further.

FIG. 14 shows the ICU of k'th user of i'th stage (i being an integer of 2 or more) of the CDMA demodulating apparatus which is achieved under such a concept.

Differences of ICU 510-$k$ from the ICU 210 in the first embodiment shown in FIG. 5A are as follows.

(1) Interference replica eliminators 505 (505-1–505-Lk) are newly provided. The interference replica eliminators 505 are to eliminate interference replicas due to multipath waves of own channel.

An interference subtractor 504-$k$ of FIG. 14 corresponds to the interference subtractor 224 of FIG. 5B, which subtracts interference replicas of other users from received spread signal S$_2$ (delayed received spread signal S) supplied to an input terminal 501. That is, the interference subtractor 504-$k$, for users from the first user to (k−1)'th users before itself, subtracts the interference replicas obtained in the present stage i from the received spread signal, and for users from (k+1)'th to M'th user after itself, subtracts the interference replicas obtained in the immediately prior (i−1)'th from the received spread signal. A received spread signal S$_3$ subtracted by interference replicas of other users is fed to the interference replica eliminators 505.

The interference replica eliminators 505 eliminate by subtracting interference replicas of other multipath obtained in the immediately prior (i−1)'th stage from the received spread signal S$_3$. For example, the interference replica eliminator 505-1 subtracts all multipath interference replicas after the second multipath obtained in the previous (i−1)'th stage from the received spread signal S$_3$. In general, considering Li'th multipath wave of k'th user, interference replicas other than Li of k'th user estimated by the previous stage ICU are subtracted from the received spread signal S3. The thus obtained received spread signal is fed to the matched filter 211 provided corresponding to each path, and thereafter subjected to the same processing as in the first embodiment, and respread by the respreader 217. In FIG. 14, Lk is the number of RAKE combining paths of user k.

(2) Output of the respreader 217 of each path is outputted from the output terminal 507 (507-1–507-Lk) as an interference replica of multipath wave of the present stage. These interference replicas are fed to the next (i+1)'th stage to be used for eliminating interference replicas of multipath waves.

In the ICU of FIG. 14, the interference replica eliminators 504 and 505 are disposed outside and inside the ICU, but the present invention is not limited to this configuration. In short, a signal subtracted by interference replicas of other users and interference replicas of multipath waves of other paths of own channel may be subtracted from the received spread signal as an input signal to the matched filter 211 in the ICU 510.

With the present embodiment, SIR can be improved even further as compared with the first embodiment. As a result, reception characteristics can be improved thereby increasing the subscriber capacity of the system.

Embodiment 5

FIG. 15 is a block diagram showing the construction of an interference canceler after the second stage of a fifth embodiment of the CDMA demodulation apparatus according to the present invention. In the present embodiment, the decision data outputted from a data decision block 215 is matched in amplitude with that of a desired wave to produce an interference replica of each multipath of each user in high accuracy.

A difference of the fifth embodiment shown in FIG. 15 from the fourth embodiment shown in FIG. 14 is that a circuit for determining an amplitude value of decision data is newly provided. This point will be described below. A reception signal power detector 210 (521-1–521-Lk: Lk being the number of RAKE combining paths) determines a signal power of despread signal of each path. This can be determined as a square-law sum of amplitude of the in-phase component and quadrature component of the despread signal. An adder 523 adds each output of the power detector 521 of the RAKE combining multipaths to obtain a reception signal power after RAKE combining. An in-phase/quadrature component amplitude converter 525 determines absolute amplitude S of in-phase component and quadrature component of the reception signal from the reception signal power. Since the amplitude values of individual symbols are varied by the influence of noise, the values are averaged over 1 pilot block to obtain an amplitude value removed of the influence of noise. The averaging is achieved by an averaging unit 527. The averaged amplitude value is fed to a multiplier 529, to be adjusted so that the amplitude value of the decision data matches with the amplitude value of the reception signal.

With the present embodiment, interference replicas of each multipath of each user can be produced with good accuracy.

Embodiment 6

Figure 16B:
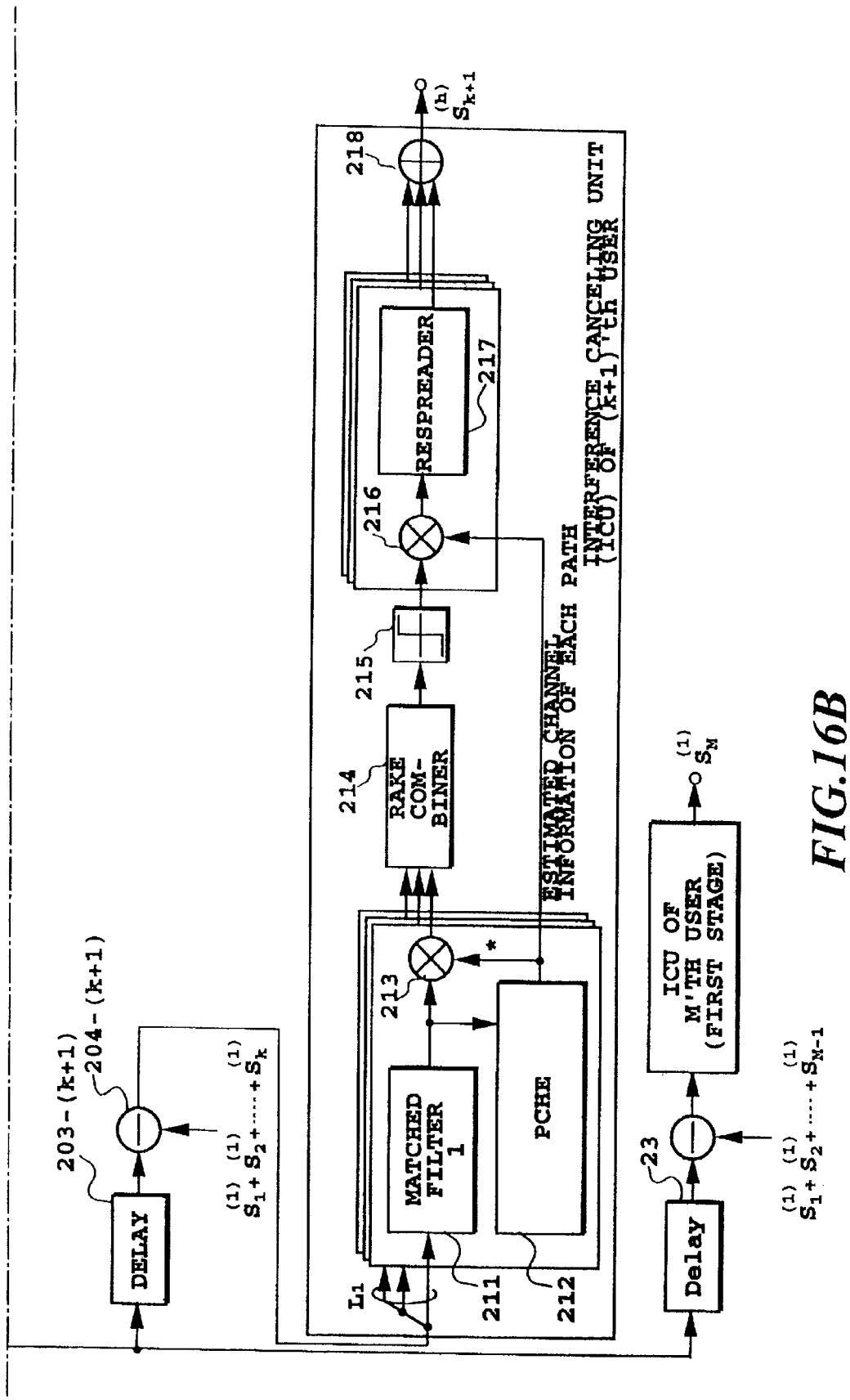

FIGS. 16A and 16B are block diagrams showing the construction of a first stage interference canceling block of a sixth embodiment of th CDMA demodulating apparatus according to the present invention. Other components are similar to the construction shown in FIG. 4. That is, the matched filter 103, the received level detector 104, the channel ranking unit 105, the interference canceling blocks 107 and 108 after the second stage are similar to those in the first embodiment.

As described above, the matched filter 103 makes correlation detection of the spreading code replica synchronized with the received spread signal of each path of each channel with the received spread signal S. The received level detector 104 calculates the sum of reception power of each path outputted from the matched filter 103 to detect the reception signal level of a desired wave. The channel ranking unit 105 outputs channel ranking information for controlling the order of demodulation of users of receiver input.

A difference of the interference canceling block of the present embodiment from the interference canceling block shown in FIG. 5A is that the interference canceling block of first–k'th users is constructed about a decorrelator (decorrelation filter) as the center.

In FIGS. 16A and 16B, matched filters 601 (601-1–601-$k$) despread signals of each path of k users from higher reception signal level according to the channel ranking information supplied from the channel ranking unit 105. A decorrelator 603 functions as a decorrelation filter, which outputs despread spectrum interference eliminated from each other using signals from each matched filter of each path of k users from higher reception signal level as an input spectrum according to the information from the matched filter 601 and the channel ranking unit 105.

Coherent detector/interference production units 610 (610-1–610-$k$) has the same construction as the ICU 210 of FIG. 5A with the matched filter 211 removed, which calculates interference replicas of the first–k'th channels from the output signal of the decorrelator 603.

For (k+1)'th–M'th users, the procedure is similar to the corresponding portion of the first embodiment. That is, the delay unit 203, the interference subtractor 204, and the ICU 210 are similar to those in the first embodiment. Thus, for k users of high reception signal level, interference replicas are estimated according to the output of the decorrelator 603, and using the estimated interference replicas, demodulation is performed on remaining (M–k) users. Further, in the interference canceling block after the second stage, estimated interference replicas of each user are calculated as in the first embodiment. The interference canceling block 108 of the last (H'th) stage outputs the reproduction data of each user.

The decorrelator 603 makes quadrature processing on ΣLk users of high reception signal level to improve the SIR of the received spread signal. Quadrature processing by the decorrelator 603 is performed as follows. Specifically, the decorrelator 603 produces the received spreading code replicas of each path from the spreading code of k users and the reception timing. Then, cross-correlation between ΣLk spreading codes is calculated to produce a correlation matrix using the cross-correlation values. Further, an inverse matrix of this correlation matrix is calculated and applied to reception signal vectors to make quadrature processing between reception signal vectors of all paths of k users.

As a result, for example, signals of each path of the first user quadrate with signals of each path of 2nd–k'th users. Therefore, interference signals to each path of the first user are only residual interference signals from each path of (k+1) to M'th users, thus the SIR is improved. On each path of k users which is quadrature processed by the decorrelator 603 is subjected to channel variation estimation, channel variation compensation, RAKE combining, and interference replica production by the coherent detector/interference production unit 610. These interference replicas of k users are inputs to the ICUs 210–(k+1) of (k+1)'th user, which are processed as in the first embodiment.

With the present embodiment, defect of the first embodiment is eliminated. That is, the first embodiment, the user of high reception signal level which is subjected to interference replica estimation in the first step has been disadvantageous. However, in the present embodiment, since, for the first k users, interference canceling is performed by the decorrelator 603, such a defect of the first embodiment can be eliminated. The value of k is typically 2 or more, and less than the spreading factor PG, but cannot be an excessively high value. This is because the dimension of the matrix treated by the decorrelator rapidly increases as the number of channels increases.

Embodiment 7

Figure 17B:
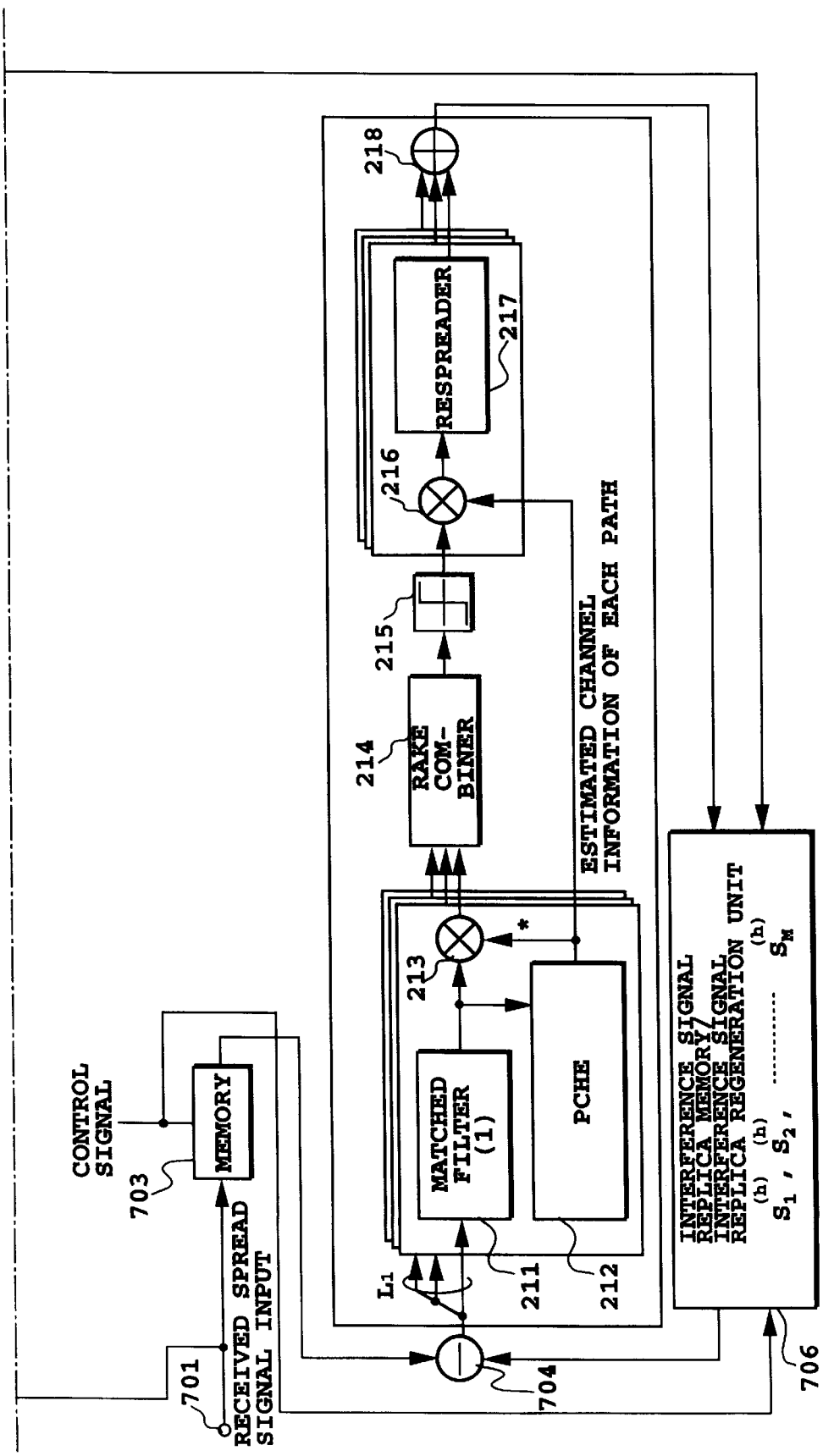

FIGS. 17A and 17B are block diagrams showing a seventh embodiment of an interference canceling block of the CDMA demodulating apparatus according to the present invention. A difference of the present embodiment from the sixth embodiment is that processing of all stages to M users is carried out by a single ICU. That is, the hardware is simplified by repeatedly using a single ICU in time division.

Since the construction and functions of the present embodiment can be easily understood from the second and sixth embodiments, detailed description thereof is omitted.

Embodiment 8

Figure 18A:
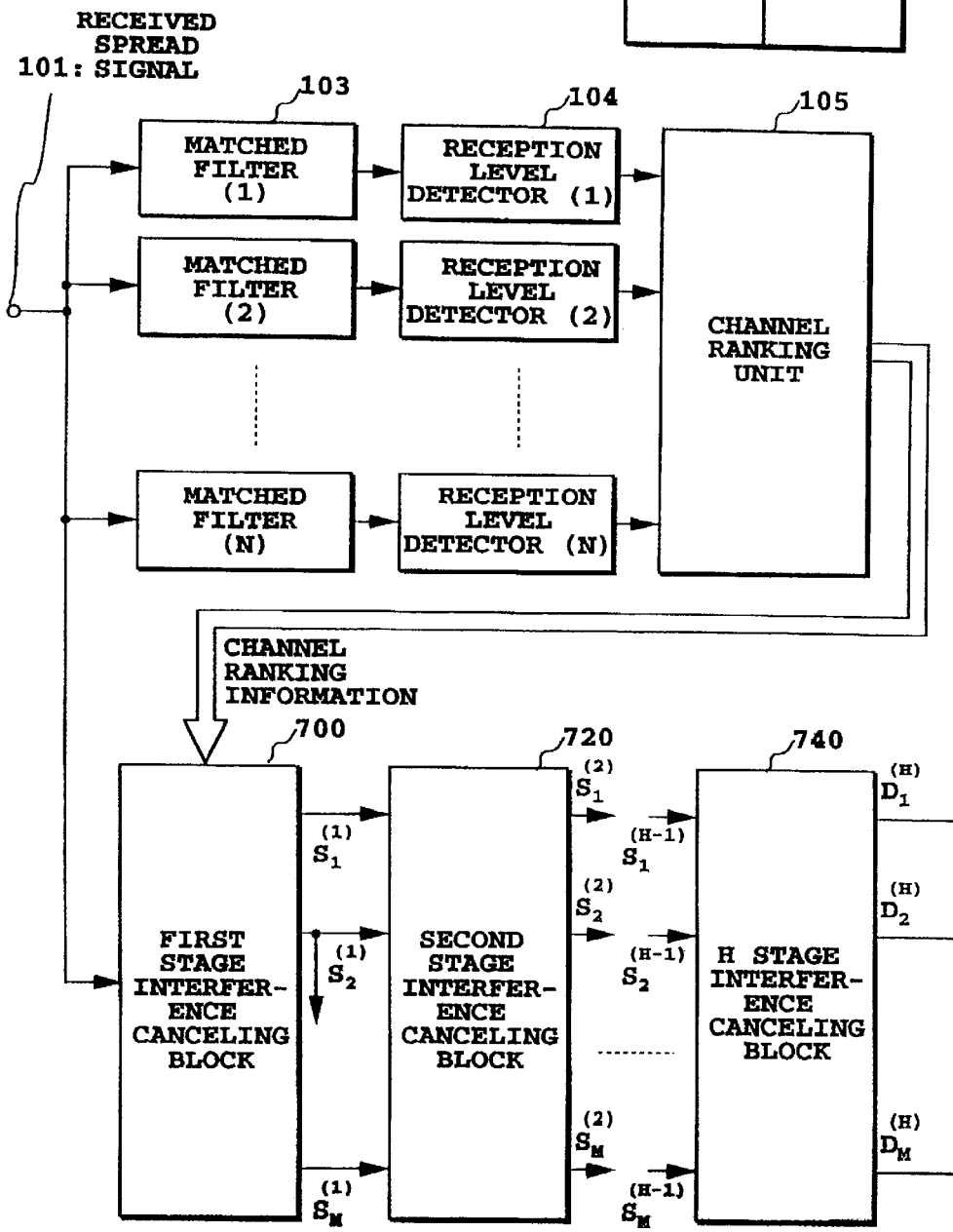
FIGS. 18A and 18B are block diagrams showing the entire construction of an eighth embodiment of the CDMA demodulating apparatus according to the present invention.
Figure 18B:
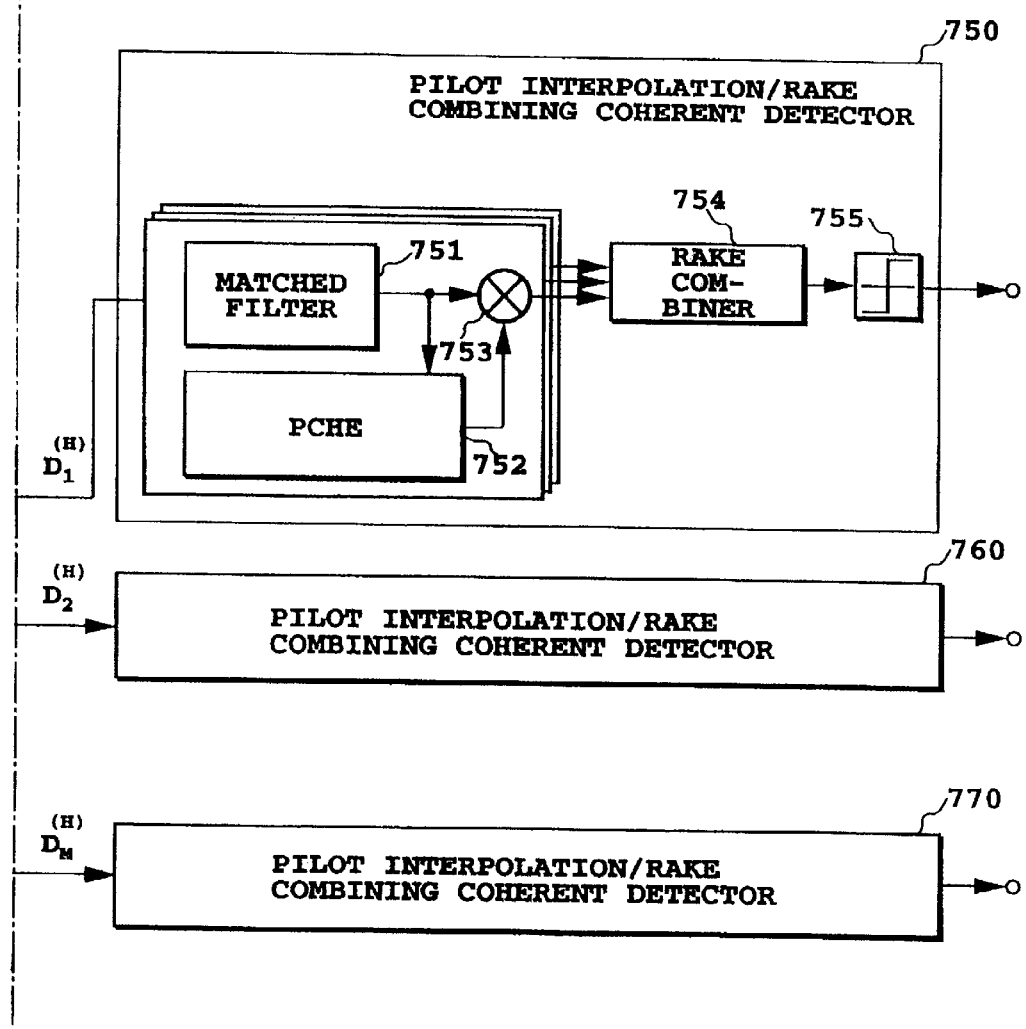

FIGS. 18A and 18B are block diagrams showing an eighth embodiment of the CDMA demodulating apparatus according to the present invention.

The present embodiment is a simplification of the first embodiment shown in FIG. 4 and differs from the first embodiment in the following points.

(1) Construction of interference canceling blocks 700, 720 and 740 is simplified over the construction of the interference canceling blocks 106, 107 and 108 shown in FIG. 4.

Figure 19B:
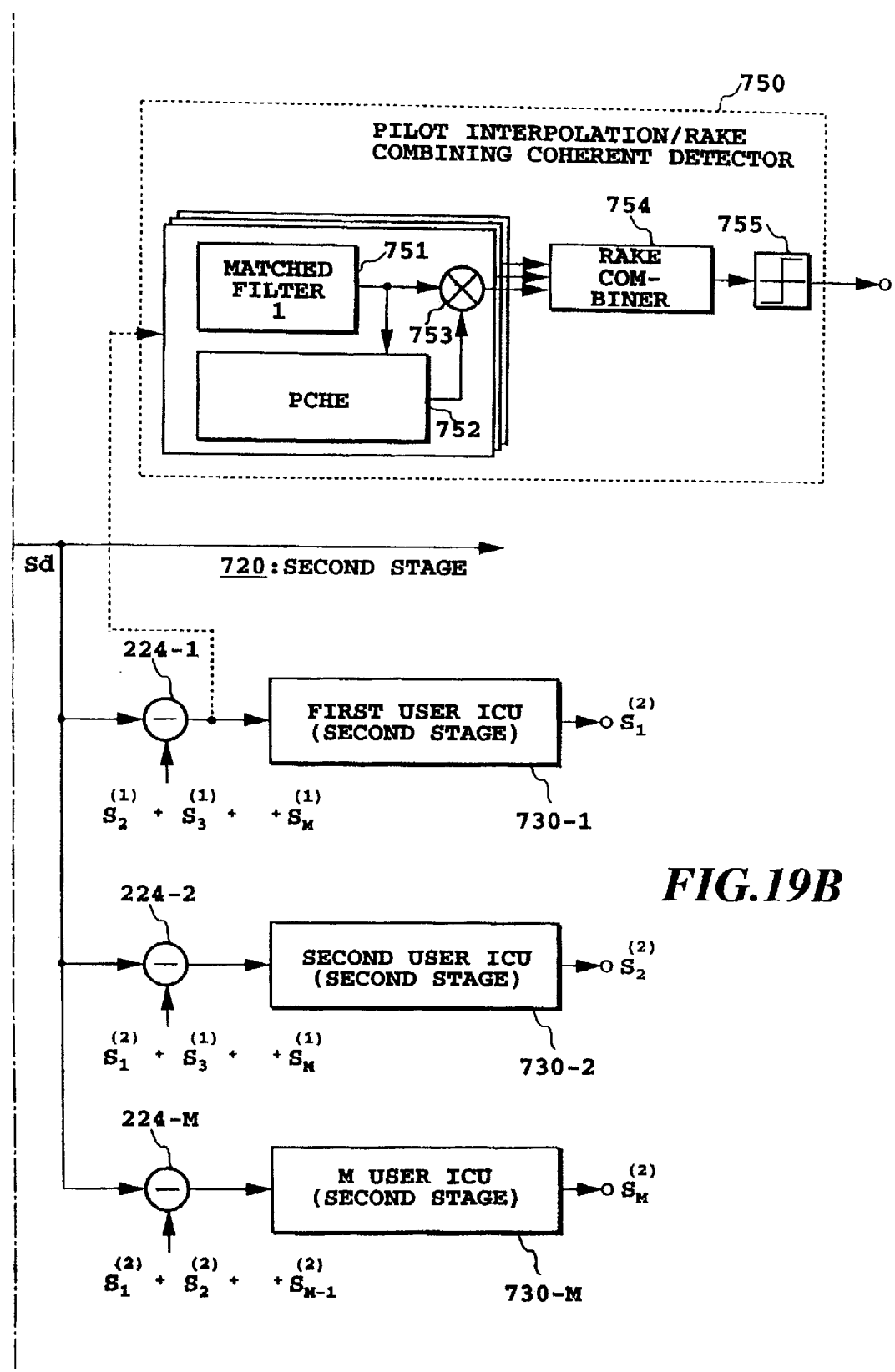

FIGS. 19A and 19B are block diagrams showing the construction of first and second stage interference canceling blocks. However, the portion surrounded by the broken line in FIG. 19B relates to a modification of the present embodiment and will be described later.

The interference canceling blocks shown in FIGS. 19A and 19B differ from the interference canceling blocks shown in FIG. 5A in the construction of the ICU 710 (710-1–710-M). The ICU 710 does not perform estimation/compensation and data decision of the despread signal. Specifically, the components 212–216 are omitted from the ICU 210 of FIG. 5A. That is, the matched filter 211 of the ICU 710 despreads the received spread signal in each path and outputs the despread signal. The despread signal is fed directly to the respreader 217. The respreader 217 respreads the despread signal of each path using the spreading code replica synchronized with the received spreading code of each path to obtain the interference signal replica of each path. The adder 218 determines the sum of interference signal replicas of each path. This is the estimated interference replica $S_1^{(1)}$ of user 1. Thus, the signal despread by the matched filter 211 is immediately respread by the respreader 217 to simplify the circuitry compared with the first embodiment.

(2) The pilot interpolation/RAKE combining coherent detectors 750, 760 and 770 are connected to the output side of the interference canceling block 740 of the last stage.

Interference-reduced signals $D_1^{(H)}$, $D_2^{(H)}$, $D_M^{(H)}$ are outputted from ICU of each channel of the interference canceling block 740 of the last stage, that is, H'th stage. These signals are inputted individually to the pilot interpolation/RAKE combining coherent detectors 750, 760 and 770 provided in each channel. Construction and operation of the detector 750 is the same as the construction and operation from the matched filter 211 to the data decision block 215 in ICU 210 of the first embodiment, which will be briefly described below.

The matched filter 751 receiving the signal $D_1^{(H)}$ from the interference canceling block 740 despreads the signal in each path. The PCHE (pilot symbol channel variation estimator) 752 estimates variation of each pilot symbol, which is averaged in the pilot section to be determined as a phase variation estimation value. The channel variation compensator 753 interpolates the phase variation estimation value into each position of information symbol sandwiched between pilot symbols to estimate the channel phase variation of each information symbol, and compensates for channel variation of information symbol section using the estimation channel phase variation to the output of the matched filter 751. The RAKE combiner 754 makes RAKE combination of the phase-compensated signal of each path using the reception power of each path as weighting. The data decision block 755 decides the RAKE synthesized signal to output reproduction data. Thus, absolute synchronization detection is achieved.

The present embodiment, unlike the above-described other embodiments, does not perform phase estimation of each path for each user of each stage. This considerably simplifies the construction of the interference canceling block of each stage. Since the interference signal replica in the present embodiment is not subjected to data decision, it is subject directly to the influence of thermal noise, however, this is nearly equivalent to the influence of decision error when the producing the reproduction data replica in the above-described other embodiments. Further, since the reproduction data replica is not produced, it is considered that in the resulting interference signal replica, influence of cross-correlation of each spreading code is transmitted to the interference canceling block of each stage, but the influence can be reduced by suppressing the number of stages of the interference canceling blocks to a few stages.

In the present embodiment, the matched filter is used as despreading means, however, alternatively, a serial canceler of the same characteristics can be constructed using a sliding correlator.

The portion surrounded by the broken line in FIG. 19B indicates a modification of the eighth embodiment. In this modification example, input signal to each ICU 730 of the interference canceling block 720 of the second stage is inputted to the pilot interpolation/RAKE combining coherent detector 750.

Embodiment 9

Figure 20:
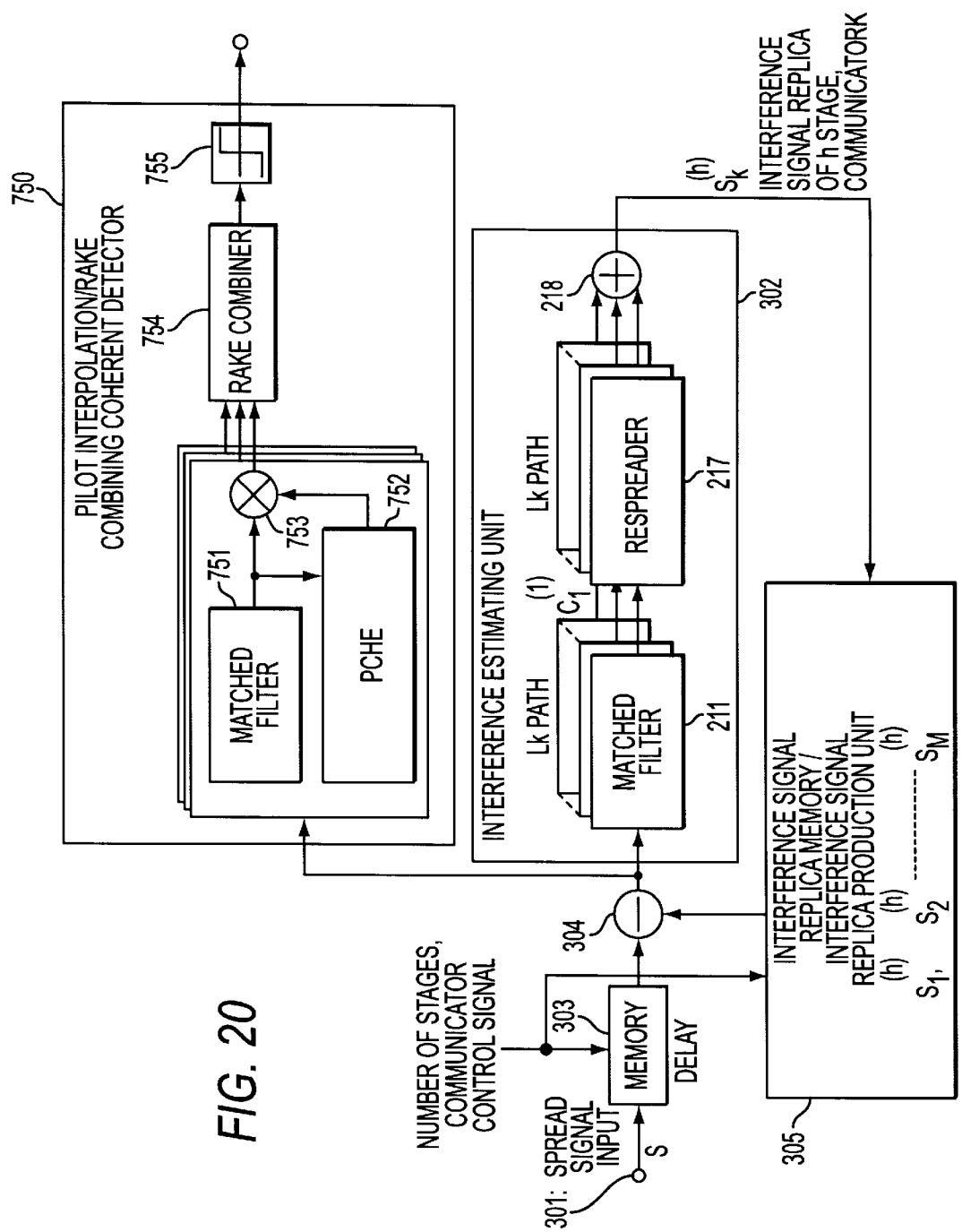
FIG. 20 is a block diagram showing the multi-stage interference canceler and a pilot interpolation/RAKE combining coherent detector of a ninth embodiment of the CDMA demodulating apparatus according to the present invention.

FIG. 20 is a block diagram showing a ninth embodiment of the CDMA demodulating apparatus according to the present invention. The present embodiment is a simplified example of the second embodiment shown in FIG. 10, and since construction and functions thereof are understood from the second and eighth embodiments, detailed description thereof is omitted.

Embodiment 10

As described above, in DS-CDMA, each communicator is subject to instantaneous variation due to fading, short period variation, and distance variation. Therefore, to satisfy the desired reception quality in a mobile station, it is necessary to make a transmission power control to control the SIR in the receiver input of the base station.

Transmission power control is divided into an open loop type and a closed loop type. In the former, SIR is measured at the receiving side, and the transmission power is controlled according to the measured result. In the latter, SIR is measured at the receiving side, and according to a difference between the measured result and a target SIR value, a transmission power control signal is transmitted to the transmission counterpart to control the transmission power of the counterpart. When there is no correlation between transmission and reception carrier levels, the closed loop type transmission power control is effective.

Characteristics when the closed loop type transmission power control is applied in CDMA mobile communications are determined mainly by control delay.

Figure 21:
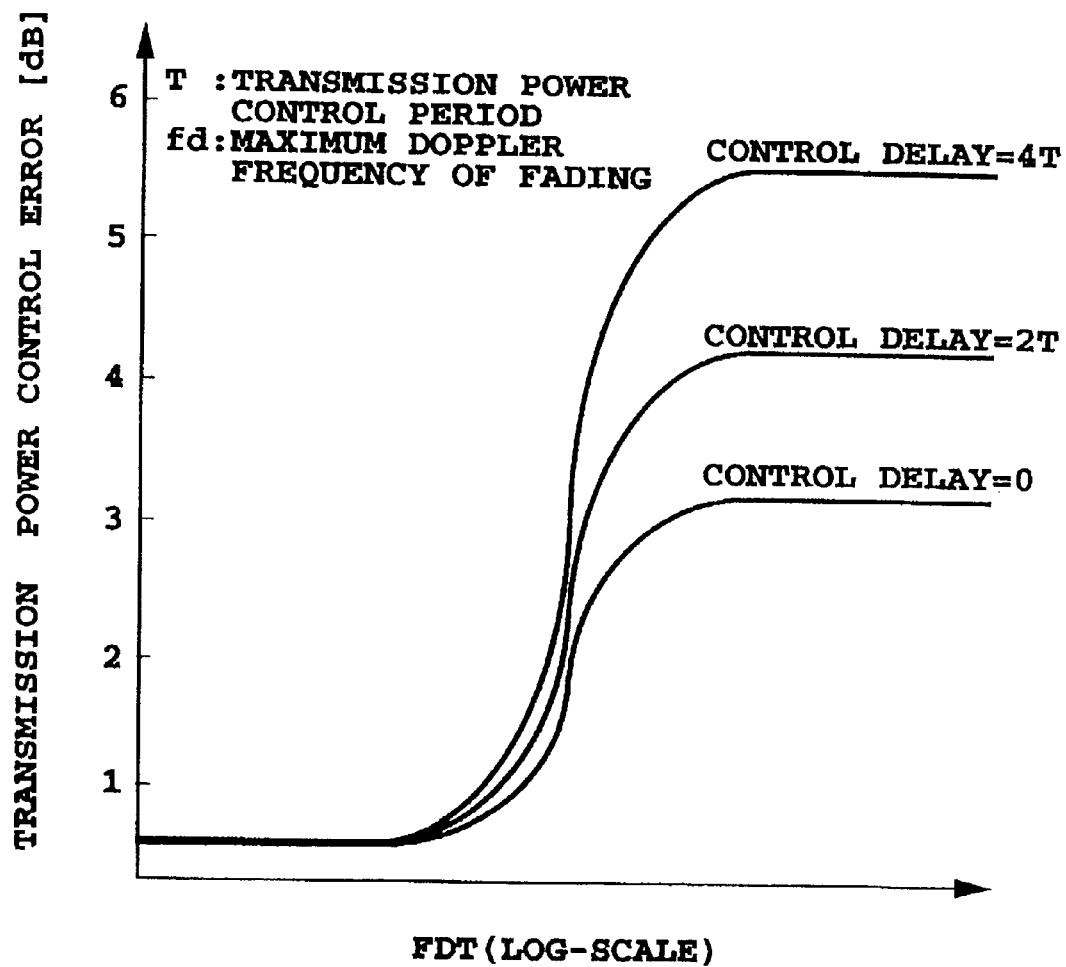
FIG. 21 is a graph showing an error of closed loop transmission power control against a fading rate.

FIG. 21 is a graph showing an example of error characteristics of transmission power control when transmission power control delay is used as a parameter. As the fading rate fdT (abscissas) normalized by the control period of transmission power control increases, control error (ordinates) of transmission power increases. When fading exceeds a certain rate, transmission power control does not follow the fading, and the characteristic becomes flat. Further, as the control delay increases, the flat portion of control error increases. If transmission power control error increases, communication quality degrades in the section where SIR is lower than the target value, which leads to a reduction in the subscriber capacity. Therefore, it is desirable that delay of transmission power control be as small as possible.

On the other hand, even if transmission power control is perfect and SIR in the receiver input is guaranteed to be constant, spreading codes will never completely quadrate with each other under multipath environment of mobile communications. Therefore, communication is affected by interference from other communicators, the magnitude of which is a reciprocal of the spreading factor at an average per one of other communicators. Therefore, when the number of communicators in the same frequency band increases, the interference signal power level increases, and the communicator capacity per cell is limited. To further increase the communicator capacity per cell, the above-described interference canceling technique is used.

Since, when an interference canceler is used at the receiving side, the interference power is reduced and the reception SIR is improved, transmission power can be reduced compared with the case where no interference canceler is used. Therefore, interference amount to other communication channel is reduced, and reception SIR of each communication channel is improved even further.

To efficiently utilize the SIR improvement effect by the interference canceler, it is necessary to measure SIR of the signal after interference reduction. However, the multiuser interference canceler has processing delay. For example, in the multi-stage type, processing delay is increased with increases in the number of stages and the number of users. Further, in the decorrelator type, as the numbers of users and paths increase, processing amount required for inverse matrix calculation increases, further, to perform quadrature processing to a plurality of past and future symbols, a processing delay of several symbols is unavoidable.

As described above, characteristics of transmission power control are determined mainly by control delay. When SIR of the signal after interference reduction is measured, the control delay is considerably large. As a result, transmission power control error becomes large, leading to a reduction in subscriber capacity.

For the above reasons, a method in which the reception SIR improving effect when the multiuser interference canceler is used is applied to closed loop transmission power control has not been disclosed. The present embodiment, when the interference canceler is applied in the receiving side, causes closed loop transmission control to efficiently function, thereby achieving transmission power reduction and subscriber capacity increasing effects.

Figure 22:
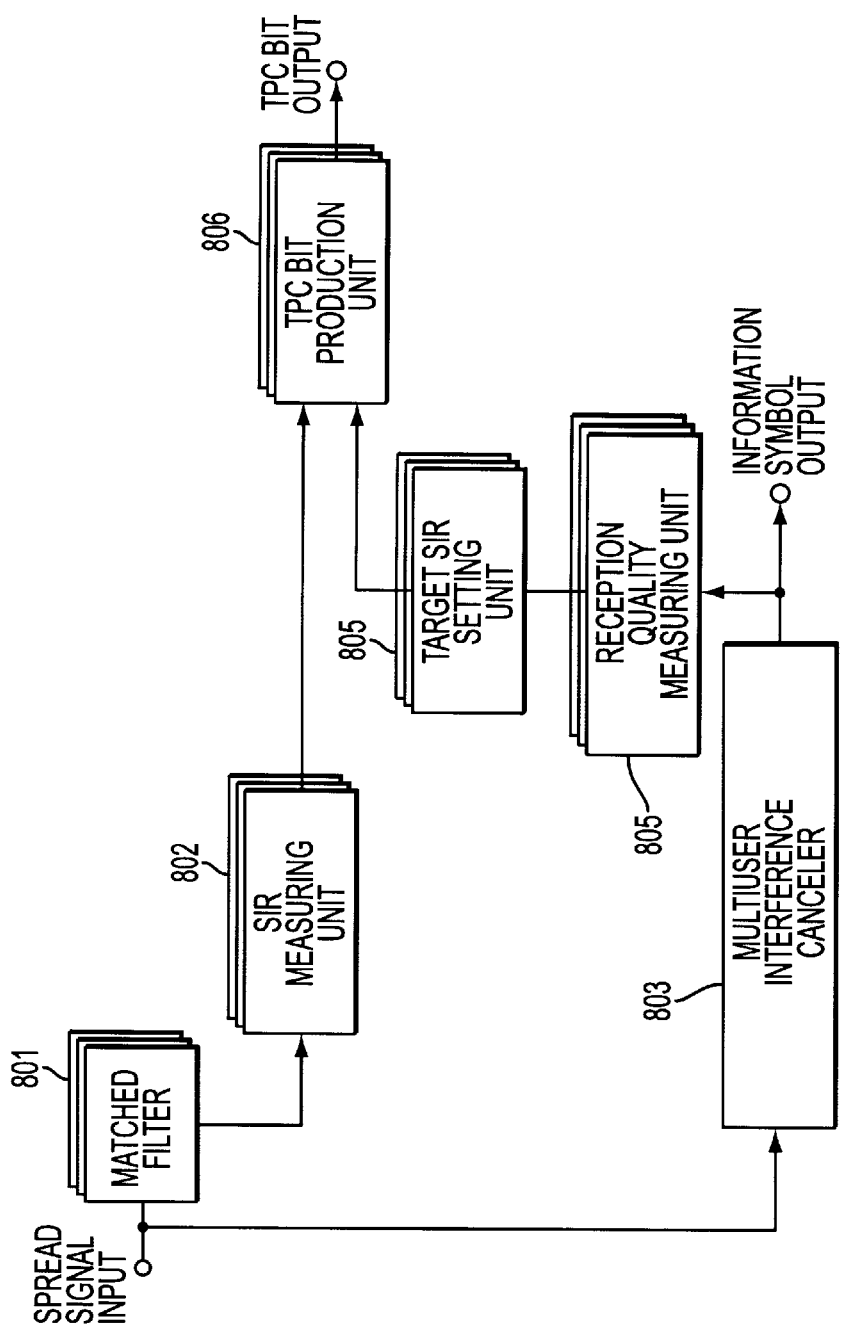
FIG. 22 is a block diagram showing an embodiment in which transmission power control is applied to the CDMA demodulating apparatus according to the present invention.

FIG. 22 is a block diagram showing an embodiment of applying the transmission power control to the CDMA demodulating apparatus according to the present invention.

In FIG. 22, a matched filter 801 performs correlation detection using the spreading code synchronized with the reception timing of each path of each communication channel to N (N being an integer of 2 or more) communicators communicating in the same frequency band. An SIR measuring unit 802 measures SIR of the output signal of the matched filter 801. A multiuser interference canceler 803 outputs an interference-eliminated signal on each communication channel. A reception quality measuring unit 814 measures the reception quality of the interference-eliminated signal of each channel outputted from the multiuser interference canceler 803. A target SIR setting unit 805 compares the reception quality outputted from the reception quality measuring unit 804 with a predetermined reception quality to set a target SIR value. A TPC (transmission power control) bit production unit 806 compares the reception SIR obtained from the SIR measuring unit 802 with the target SIR obtained from the target SIR setting unit 805 to produce a transmission power control signal.

Figure 23A:
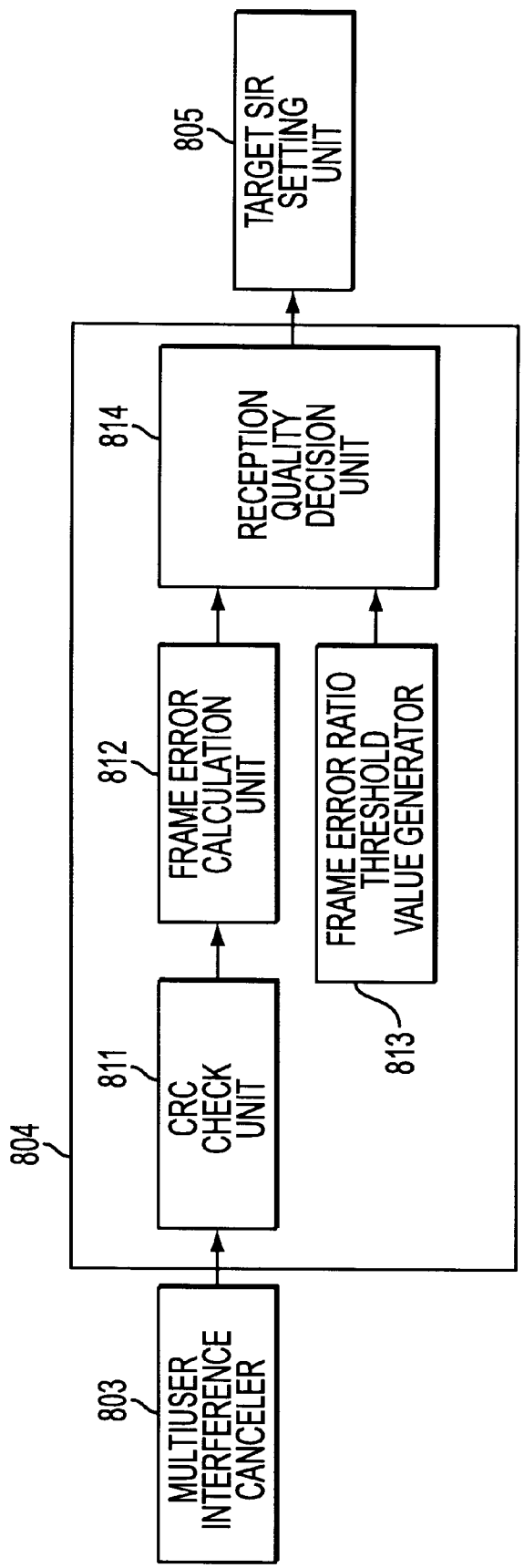
FIGS. 23A and 23B are block diagrams showing the construction of a reception quality measuring unit of FIG. 22.
Figure 23B:
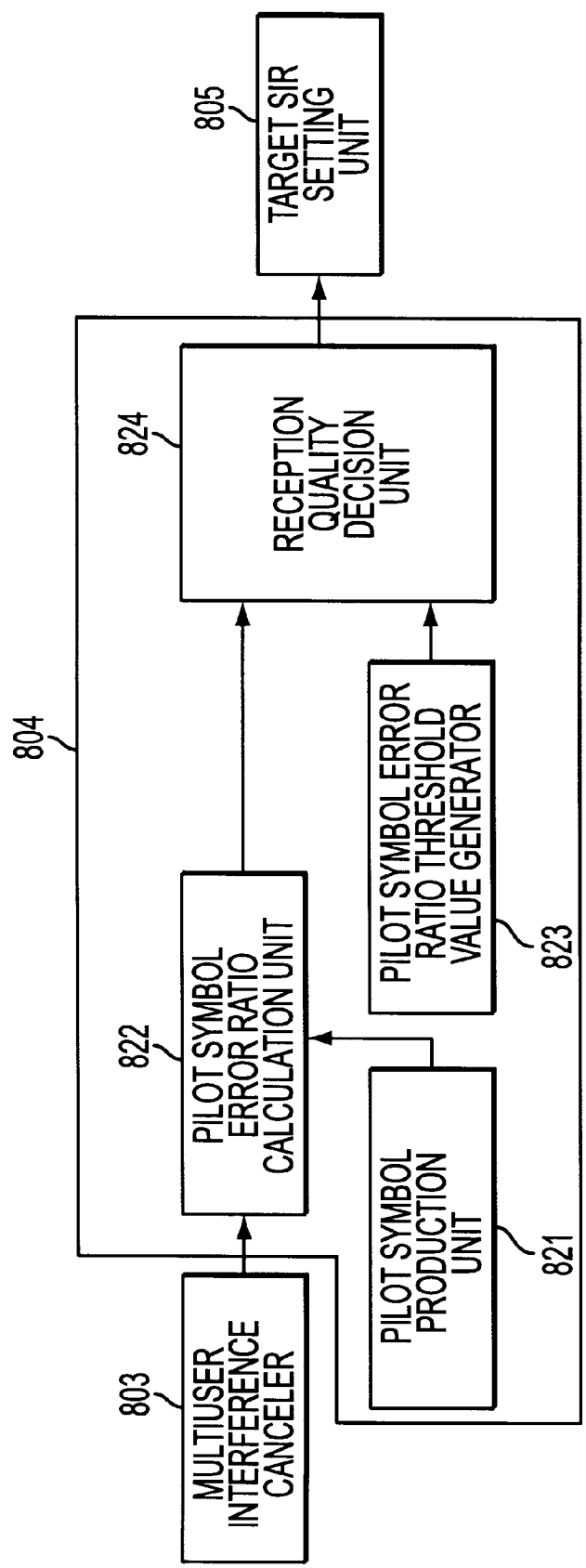

FIGS. 23A and 23B are block diagrams showing details of the reception quality measuring unit 804, FIG. 23A shows the reception quality measuring unit 804 for measuring the frame error ratio to monitor the reception quality, and FIG. 23B shows the reception quality measuring unit 804 for measuring the error ratio of pilot symbol to monitor the reception quality. While transmission power control is directed to follow momentary variation to achieve the target SIR, the reception quality measuring unit 804 performs averaging over a relatively long time and monitors communication quality in the output of the interference canceler 803 to correct the target SIR value of transmission power control. Therefore, processing delay of the interference canceler 803 has no problem.

In FIG. 23A, a CRC check unit 811 performs CRC test (Cyclic Redundancy Check) of reception data outputted from the multiuser interference canceler 803. That is, reception data is inputted to the divider circuit by the produced polynomial to decide whether the remainder is zero or not. If the remainder is zero, it is decided that there was no frame error in the communication path, and if the remainder is not zero, it is decided frame error to have occurred.

A frame error calculation unit 812 calculates the number of frame errors and outputs a frame error ratio. A frame error ratio threshold value generator 813 outputs a frame error ratio threshold value. A reception quality decision block 814 compares the frame error ratio with the threshold value to output a signal indicating the reception quality. A target SIR setting unit 805 corrects a reference SIR by this signal and outputs a corrected reference SIR.

The reception quality measuring unit 804 by the error ratio of pilot symbol, shown in FIG. 23B, comprising the following. A pilot symbol production unit 821 produces a pilot symbol of a known pattern. A pilot symbol error ratio calculation unit 822 extracts the pilot symbol from reception data outputted from the multiuser interference canceler 803, and compares it with the pilot symbol supplied from the pilot symbol production unit 822 to calculate the pilot symbol error ratio.

The pilot symbol error ratio threshold value generator 823 outputs a threshold value of pilot symbol. The reception quality decision block 824 compares the pilot symbol error ratio with its threshold value and outputs a signal indicating the reception quality. The target SIR setting unit 805 corrects the reference SIR by the signal and outputs a corrected reference SIR.

Operation of the present embodiment will be described. The matched filter 801 detects correlation of the received spreading code with the spreading code replica for each path of each communication channel and outputs the despread signal of each user. The SIR measuring unit 802 measures SIR of each user using the despread signal. On the other hand, the multiuser interference canceler 803 outputs the interference-eliminated despread signal using the received spread signal. However, the despread signal accompanies processing delay.

The reception quality measuring unit 804 measures communication quality of the despread signal outputted from the interference canceler 803. The measured communication quality is fed to the target SIR setting 805 to be compared with a predetermined reception quality.

Figure 24:
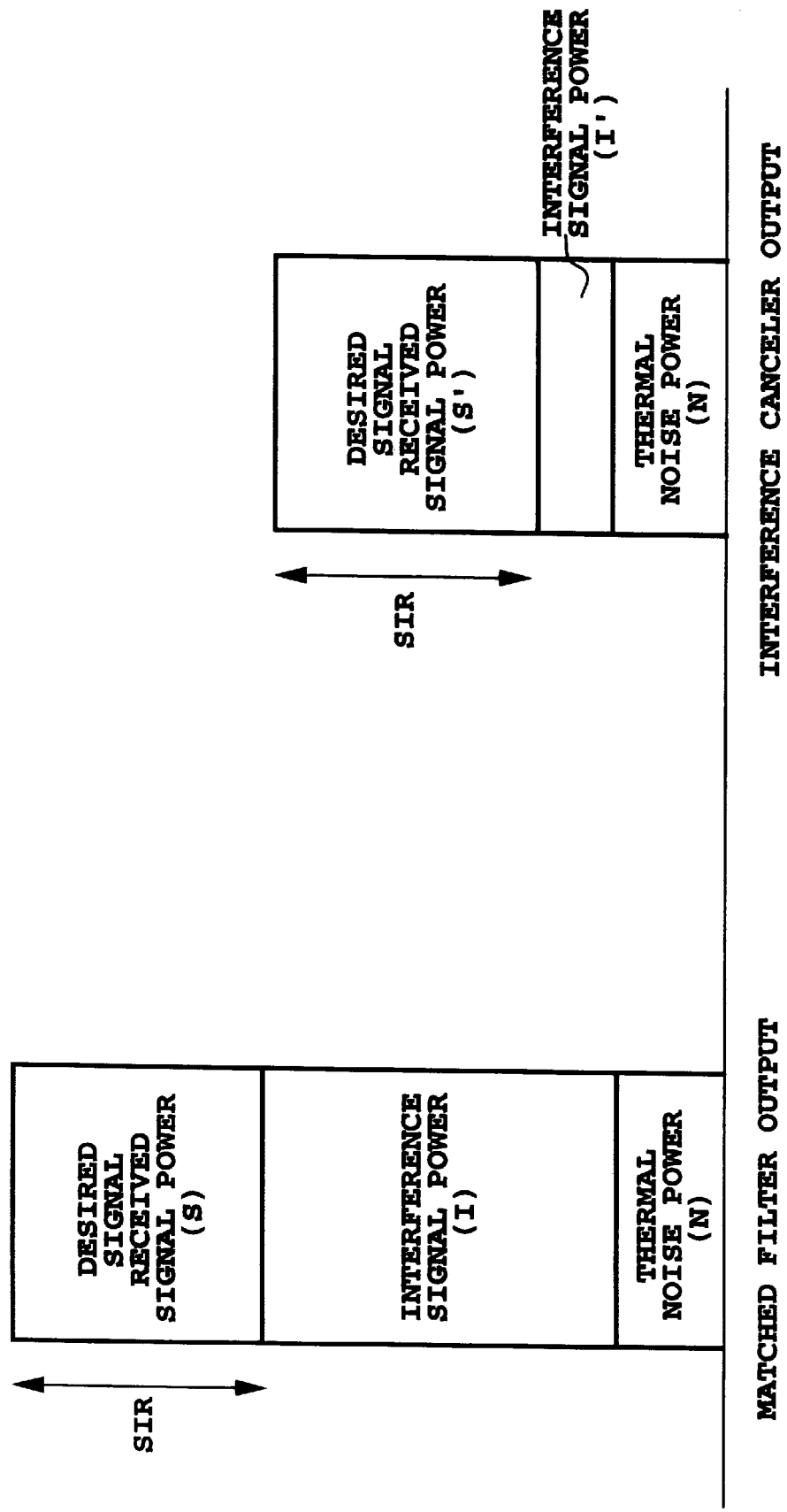
FIG. 24 is a schematic view comparing reception power in a matched filter output in FIG. 22 with reception power in an interference canceler output.

FIG. 24 is a schematic view comparing the output of the matched filter 801 with the output of the interference canceler 803. The target SIR is set by the target SIR setting unit 805 as follows.

(1) The target SIR is set to a slightly lower value than a required SIR in the output of the interference canceler 803 in view of an interference reduction effect by the interference canceler 803.

(2) Since the interference eliminating capability of the interference canceler 803 can be estimated to some extent from the number of simultaneous communicators, the target SIR is also set according to the number of simultaneous communicators.

(3) When communication quality measured by the reception quality measuring unit 804 is better than the desired quality, the target SIR is lowered. This prevents excessive quality of communication and allows the transmission power to be reduced even further.

(4) On the contrary, when the communication quality measured by the reception quality measuring unit 804 is worse than the desired quality, the target SIR is increased.

(5) By repeating the correction of (3) and (4), the target SIR is converged to a value at which the desired quality is satisfied in the output of the interference canceler 803.

The TPC bit production unit 806 compares the measured SIR outputted from the SIR measuring unit 802 with the target SIR, and when the former exceeds the latter, sends a control signal (TPC bit) to the other communicator to cause the counterpart to decrease the transmission power. On the contrary, when the latter exceeds the former, a control signal is sent to the other communicator to cause it to increase the transmission power. This can achieve closed loop transmission power control which follows instantaneous variation of the transmission path.

Further, the required reception quality is set for each communication channel. This is because the required communication quality differs according to the provided service (voice transmission, image transmission, data transmission, and the like).

Embodiment 11

Figure 25:
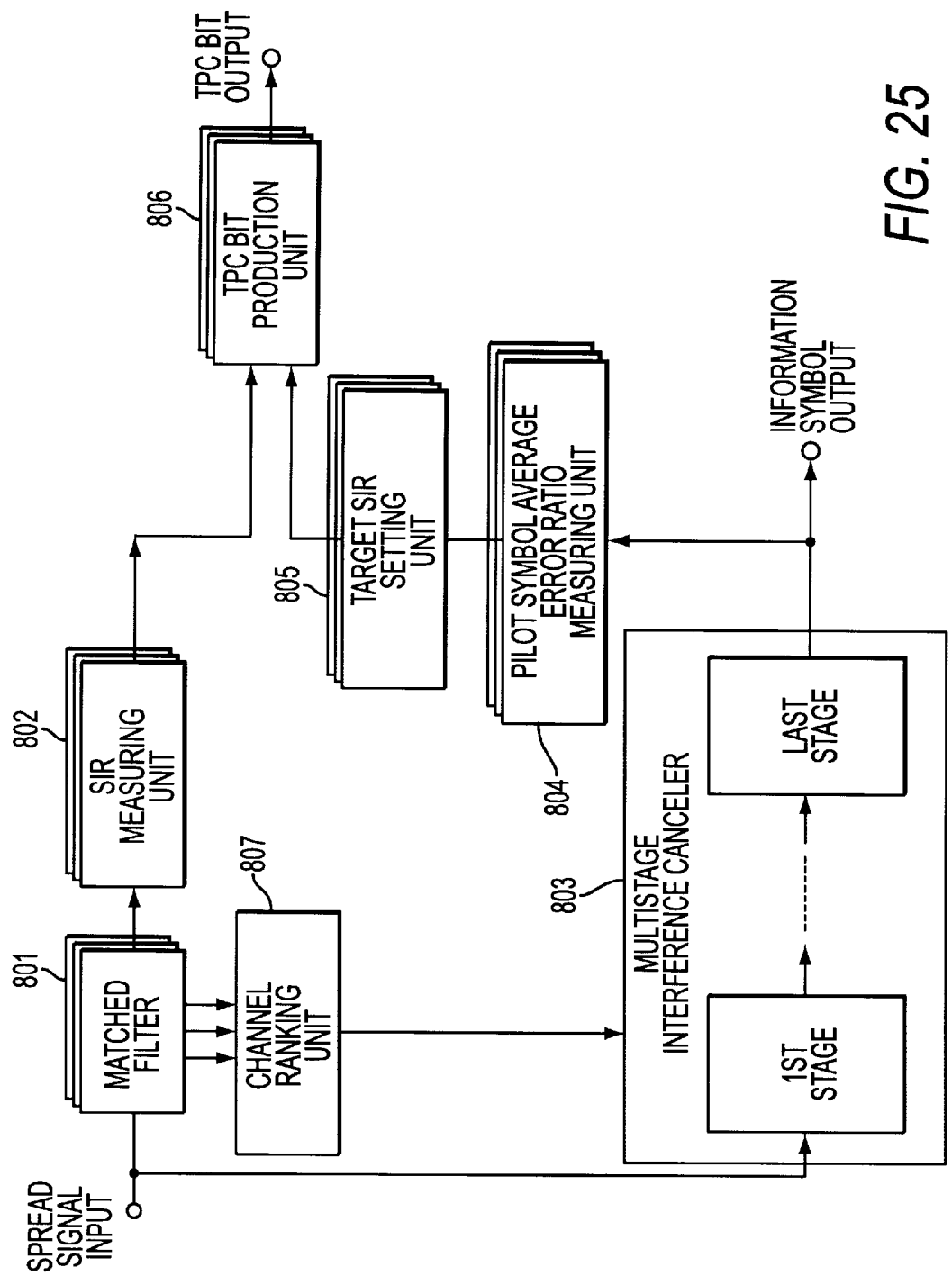
FIG. 25 is a block diagram showing another embodiment in which transmission power control is applied to the CDMA demodulating apparatus according to the present invention.

FIG. 25 is a block diagram showing another embodiment in which transmission power control is applied to the CDMA demodulating apparatus according to the present invention.

The present embodiments has the following features.

(1) The replica reproduction multistage interference canceler of the first embodiment is used as the multiuser interference canceler 803.

(2) A pilot symbol average error ratio measuring unit 804 for measuring the communication quality by the pilot symbol error ratio shown in FIG. 23B is used as the reception quality measuring unit 804.

Since operation of the present embodiment is understood from the description of embodiments 1 and 10 and FIG. 23B, it will be described briefly.

In each stage of the interference canceler 803, interference signals from other communicators are demodulated and decided to reproduce transmission information data replicas. Interference signal replicas of each channel are calculated from the reproduced data replicas, and subtracted from the reception signals to enhance SIR to the desired wave signal to be demodulated.

On the other hand, the channel ranking unit 807 performs channel ranking to rearrange the communicators in the order of stronger reception power. According to the result, the interference canceler 803 demodulates the desired wave signal in the order of stronger reception power. By performing this operation over individual stages, the later the stage, the more the SIR is improved. Further, as the accuracy of interference signal replica is improved in each stage of the interference canceler 803, variation estimation accuracy of each channel is improved. Therefore, the interference canceling effect is improved when there are a large number of communicators.

Embodiment 12

Figure 26:
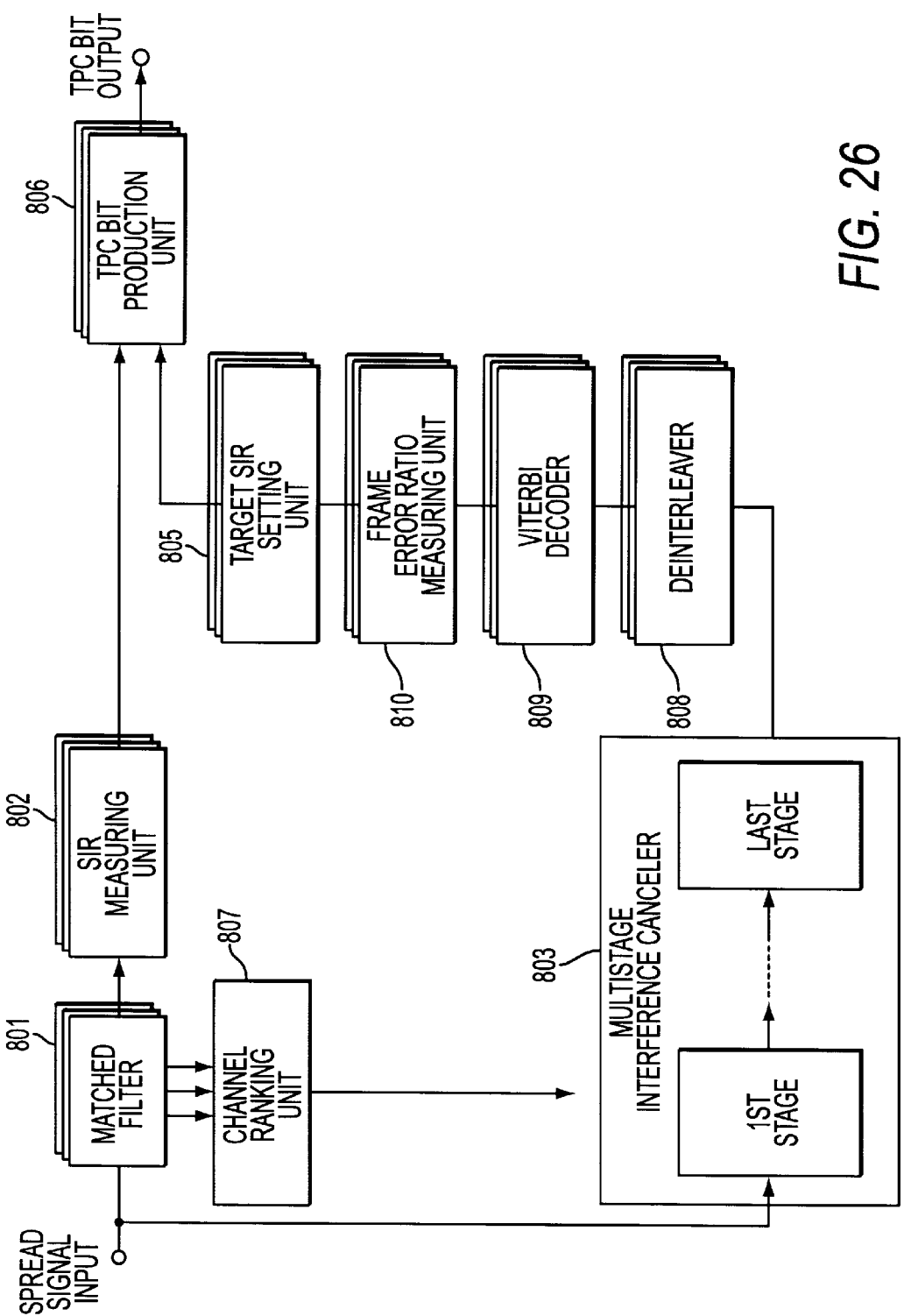
FIG. 26 is a block diagram showing a further embodiment in which transmission power control is applied to the CDMA demodulating apparatus according to the present invention.

FIG. 26 is a block diagram showing a yet further embodiment in which transmission power control is applied to the CDMA demodulating apparatus according to the present invention. A difference of the present embodiment from the embodiment 11 shown in FIG. 25 is that a reception quality measuring unit comprising a deinterleaver 808, a Viterbi decoder 809, and a frame error ratio measuring unit 810 is provided in place of the pilot symbol average error ratio measuring unit 804.

The same functions and effect as of embodiment 11 can also be obtained using this construction.

What is claimed is:

1. A CDMA (Code Division Multiple Access) demodulating apparatus for use in a CDMA communication system that performs spreading information data by a spreading code faster than an information rate to a wideband signal and the wideband signal is transmitted to achieve multiple access transmission, wherein a pilot symbol of know pattern is received to estimate channel variation, individual reception signals received through a plurality of channels are compensated by the estimated channel variation, and the compensated reception signal is demodulated to reproduce the information data, comprising:

a correlation detector using a spreading code as a spreading code replica synchronized with a reception timing of each path of each of the channel for correlation detection of the spreading code replica with the reception signal of each path;

a received level detector for determining a sum of a reception power of a corresponding path of said correlation detector and detecting a desired wave reception signal level;

a channel ranking unit for controlling order of demodulation of the user according to the reception signal level of each user detected by said received level detector; and an interference canceler of a plurality of stages for making interference canceling according to a control signal outputted from said channel ranking unit, in each of the plurality of stages, making estimation of channel variation using the pilot symbol on each channel, compensating the reception signal of the channel by the estimated channel variation, and respreading the compensated reception signal to produce an interference signal replica.

2. The CDMA demodulating apparatus as claimed in claim 1, wherein said interference canceler of an i'th (i being an integer of 2 or more) stage of the plurality of stages uses the interference signal replica of each user estimated by the interference canceler of the (i−1)th stage as an input to supply the interference signal replica of each user estimated by the interference canceler of the i'th stage to said interference canceler of a (i+1)'th stage.

3. The CDMA demodulating apparatus as claimed in claim 2, wherein each of said interference canceler of each stage comprises a sub-interference canceler for each user for producing the interference signal replica, said sub-interference canceler of a k'th (k=any of 1, 2, ..., M) user of said interference canceler of the i'th stage comprising:

an interference subtractor for subtracting interference signal replicas in said interference canceler of the i'th stage as interference signal replicas of first, second .. . and (k−1)th users from the reception signal, subtracting interference signal replicas in said interference canceler of an (i−1)'th stage as interference replicas of (k+1)'th, . . . (M−1)'th and M'th users from the reception signal;

a channel variation estimator for estimating a channel variation of the pilot symbol in the output signal of said interference subtractor for each path, and estimating the channel variation by interpolating the channel variation of the estimated pilot symbol into a position of each symbol of the information data in the output signal of said interference subtractor;

a channel variation compensator for compensating the reception signal for the channel variation estimated for each path by said channel variation estimator;

a RAKE combiner for synthesizing the reception signal of each path outputted from said channel variation compensator;

a data decision block for deciding the output signal of said RAKE combiner;

a channel variation adder for adding a channel variation obtained as an output of said channel variation estimator to the decision data outputted from said data decision block;

a respreader for spreading a signal of each path outputted from said channel variation adder by a spreading code synchronized with reception timing of each path; and an adder for adding the output of said respreader to produce an interference signal replica of the k'th user.

4. The CDMA demodulating apparatus as claimed in claim 1, wherein said correlation detector comprises a plurality of matched filters.

5. The CDMA demodulating apparatus as claimed in claim 1, wherein said correlation detector comprises a plurality of sliding correlators.

6. The CDMA demodulating apparatus as claimed in claim 3, wherein the pilot symbol is inserted periodically between the information data.

7. The CDMA demodulating apparatus as claimed in claim 3, wherein said interference canceler of each stage comprises one unit of said sub-interference canceler, and memories for storing interference replicas of individual users of individual stages, using said sub-interference canceler in the mode of time division.

8. The CDMA demodulating apparatus as claimed in claim 6, wherein said interference canceler uses a block as a processing unit of a block of constant time including at least two adjacent pilot signal sections, and said sub-interference canceler further comprises an extrapolating unit for an information symbol outside the pilot signal section for extrapolating the pilot symbol closest to the information symbol to determine channel variation of the information symbol.

9. The CDMA demodulating apparatus as claimed in claim 3, wherein a subtractor for subtracting an interference signal replica other than of a j'th path of the k'th communicator in an (i−1)'th stage from the output signal of said interference subtractor is provided at the input side of said correlation detector of the j'th (j being 1 to a path number Lk of RAKE combining) of the k'th user of the i'th (i being an integer of 2 or more) stage interference canceler.

10. The CDMA demodulating apparatus as claimed in claim 3, wherein said sub-interference canceler further comprising:

a reception signal power detector for detecting a power of the reception signal of each path after despreading outputted from said correlation detector;

an adder for adding the reception signal powers of the individual paths;

an amplitude converter for detecting amplitudes of in-phase component and quadrature component from the output of said adder;

an averaging unit for averaging the output signal of said amplitude converter; and a multiplier for multiplying the decision data by an output of said averaging unit.

11. The CDMA demodulating apparatus as claimed in claim 1, wherein said interference canceler of the first stage comprises a decorrelation filter for using a signal of each path of K'th (K being an integer of 2 to spreading factor PG) user from the higher reception signal level to obtain a despread output vector which is interference removed from each other;

and a coherent detector/interference generator for estimating transmission data of K users outputted from said decorrelation filter and generating an estimated interference amount of each user, wherein said interference canceler uses the interference signal replica outputted from said coherent detector/interference generator as interference signal replicas of the K users to produce individual interference signals replicas of the remaining (M−K) users.

12. The CDMA demodulating apparatus as claimed in claim 11, wherein said interference canceler of i'th (i being an integer of 2 or more) stage of the plurality of stages uses the interference signal replica of each user estimated by said interference canceler of the (i−1)'th stage as an input and supplies said interference canceler of (i+1)'th stage with an estimated interference amount of each user estimated by said interference canceler of the i'th stage.

13. The CDMA demodulating apparatus as claimed in claim 12, wherein said first stage interference canceler comprises a sub-interference canceler for producing the estimated interference amount for each user after (K+1)'th user, and said sub-interference canceler of k'th (k=(K+1), (K+2), . . . , or M) user comprises:

an interference subtractor for subtracting interference signal replicas in said interference canceler of the i'th stage as interference signal replicas as estimated interference amounts of first, second . . . and K'th users from the reception signal, and subtracting interference signal replicas in said interference canceler of the first stage as interference replicas of (K+1), . . . (k−1)'th users from the reception signal;

a channel variation estimator for estimating a channel variation of the pilot symbol in the output signal of said interference subtractor for each path, and estimating the channel variation of each information symbol by interpolating the channel variation of the estimated pilot symbol into a position of each symbol of the information data in the output signal of said interference subtractor;

a channel variation compensator for compensating the reception signal for the channel variation estimated for each path by said channel variation estimator;

a RAKE combiner for synthesizing the reception signal of each path outputted from said channel variation compensator;

a data decision block for deciding the output signal of said RAKE combiner;

a channel variation adder for adding a channel variation obtained as an output of the channel variation estimator to the decision data outputted from said data decision block;

a respreader for spreading a signal of each path outputted from said channel variation adder by a spreading code synchronized with reception timing of each path; and an adder for adding the output of the respreader to produce an interference signal replica of the k'th user, wherein each of said interference canceler of and after the second stage comprises a sub-interference canceler for each user for producing the interference signal replica, said sub-interference canceler of a k'th (k=any of 1, 2, . . . , M) user of said interference canceler of the i'th stage comprising:

an interference subtractor for subtracting interference signal replicas in said interference canceler of the i'th stage as interference signal replicas of first, second . . . and (k−1)th users from the reception signal, and subtracting interference signal replicas in said interference canceler of an (i−1)'th stage as interference replicas of (k+1)'th, . . . (M−1)'th and M'th users from the reception signal;

a channel variation estimator for estimating a channel variation of the pilot symbol in the output signal of said interference subtractor for each path, and estimating the channel variation of the information symbol by interpolating the channel variation of the estimated pilot symbol into a position of each symbol of the information data in the output signal of said interference subtractor;

a channel variation compensator for compensating the reception signal for the channel variation estimated for each path by said channel variation estimator;

a RAKE combiner for synthesizing the reception signal of each path outputted from said channel variation compensator;

a data decision block for deciding the output signal of said RAKE combiner;

a channel variation adder for adding a channel variation obtained as an output of said channel variation estimator to the decision data outputted from said data decision block;

a respreader for spreading a signal of each path outputted from said channel variation adder by a spreading code synchronized with reception timing of each path; and an adder for adding the output of said respreader to produce an interference signal replica of the k'th user.

14. The CDMA demodulating apparatus as claimed in claim 11, wherein said correlation detector comprises a plurality of matched filters.

15. The CDMA demodulating apparatus as claimed in claim 11, wherein said correlation detector comprises a plurality of sliding correlators.

16. The CDMA demodulating apparatus as claimed in claim 13, wherein the pilot symbol is inserted periodically between the information data.

17. The CDMA demodulating apparatus as claimed in claim 13, wherein said interference canceler of each stage comprises one unit of said sub-interference canceler, and memories for storing interference replicas of individual users of individual stages, using said sub-interference canceler in the mode of time division.

18. The CDMA demodulating apparatus as claimed in claim 11, wherein said coherent detector/interference generator comprises:

a channel variation estimator for estimating a channel variation of the pilot symbol in the output signal of said interference subtractor for each path, and estimating the channel variation of each information symbol by interpolating the channel variation of the estimated pilot symbol into a position of each symbol of the information data in the output signal of said interference subtractor;

a channel variation compensator for compensating the reception signal for the channel variation estimated for each path by said channel variation estimator;

a RAKE combiner for synthesizing the reception signal of each path outputted from said channel variation compensator;

a data decision block for deciding the output signal of said RAKE combiner;

a channel variation adder for adding a channel variation obtained as an output of said channel variation estimator to the decision data outputted from said data decision block;

a respreader for spreading a signal of each path outputted from said channel variation adder by a spreading code synchronized with reception timing of each path; and an adder for adding the output of the respreader to produce an interference signal replica of the k'th user.

19. The CDMA demodulating apparatus as claimed in claim 1 further comprising:

an SIR measuring unit for measuring an SIR of the output of said correlation detector;

a reception quality measuring unit for measuring a reception quality of the output signal of said interference canceler;

a target SIR setting unit for setting a target SIR according to the measured reception quality and a required reception quality; and a transmission power control signal generator for comparing SIR outputted from said SIR measuring unit with the target SIR.

20. The CDMA demodulating apparatus as claimed in claim 19, wherein said SIR setting unit sets an initial value of the target SIR according to the number of simultaneous communicators.

21. The CDMA demodulating apparatus as claimed in claim 19, wherein said reception quality measuring unit comprises an error ratio measuring unit for measuring a frame error ratio, and means for comparing the frame error ratio with a predetermined threshold value of frame error ratio to decide the reception quality.

22. The CDMA demodulating apparatus as claimed in claim 19, wherein said reception quality measuring unit comprises an error ratio measuring unit for measuring a bit error ratio of the pilot symbol, and means for comparing the bit error ratio with a predetermined threshold value of bit error ratio to decide the reception quality.

23. The CDMA demodulating apparatus as claimed in claim 19, wherein said correlation detector is a matched filter.

24. The CDMA demodulating apparatus as claimed in claim 23, wherein said interference canceler comprises a reception vector generator for generating a reception vector comprising despread signal of each path for each channel from the output signal of said matched filter, a cross-correlation inverse matrix generator for calculating cross-correlation of all spreading codes other than the spreading code of own channel and receiver input to produce an inverse matrix of a matrix comprising cross-correlation, and a matrix vector multiplier for compensating the reception vector by the inverse matrix to remove cross-correlation between individual reception vectors thereby removing interference.

25. A CDMA (Code Division Multiple Access) demodulating apparatus for use in a CDMA system that performs multiple access transmission by transmitting a spread signal, the spread signal being generated by spreading information data into a wideband signal with a spreading code whose rate is higher than an information rate, wherein a pilot symbol of a known pattern to estimate a channel variation, each reception signal received through a plurality of channels is compensated by the estimated channel variation, and the compensated reception signal is demodulated to reproduce the information data, the demodulating apparatus comprising:

a correlation detector, using a spreading code in phase with reception timing of each path of each channel, for detecting correlation of the spreading code with the reception signal of each path;

a received level detector for determining a sum of a reception power of a corresponding path of the correlation detector and detecting a desired wave reception signal level;

a channel ranking unit for controlling order of demodulation of the user according to the reception signal level of each user detected by said received level detector;

an interference canceler of a plurality of stages for despreading the reception signal for individual users according to an order determined by the control signal outputted from said channel ranking unit, respreading the despread signal, and subtracting an interference signal replica of other users obtained by respreading from the reception signal of the corresponding user; and a pilot interpolation/coherent detector for estimating a channel variation using the pilot symbol in the signal after subtracting by an interference amount of other users in said interference canceler of the last stage in the plurality of stages, compensating the information data using the estimated channel variation to perform absolute synchronization detection of the compensated information data.

26. The CDMA demodulating apparatus as claimed in claim 25, wherein an i'th (i being an integer of 2 or more) stage interference canceler uses the interference signal replica of each user estimated in the (i−1)'th stage interference canceler as an input to supply the interference signal replica estimated in said i'th stage interference canceler to the (i+1)'th stage interference canceler.

27. The CDMA demodulating apparatus as claimed in claim 26, wherein each interference canceler of each of the stages comprises a sub-interference canceler for each user for producing the interference signal replica, said sub-interference canceler of a k'th (k=1, 2, . . . , or M) user of said i'th stage interference canceler comprising:

an interference subtractor for subtracting interference signal replicas in said interference canceler of the i'th stage as interference signal replicas of first, second . . . . and (k−1)th users from the reception signal, subtracting interference signal replicas in said interference canceler of an (i−1)'th stage as interference replicas of (k+1)'th, . . . (M−1)'th and M'th users from the reception signal;

a matched filter for making correlation detection between the output signal of said interference subtractor and a spreading code replica in phase with reception timing of each path to obtain a despread signal of each path; and a respreading/combiner unit for spreading the despread signal of each path with a spreading code in phase with the reception timing of each path, estimating an interference signal replica of the path of each user, and adding the estimated interference signal replica to produce an interference signal replica of each user.

28. The CDMA demodulating apparatus as claimed in claim 25, wherein the pilot symbol is inserted periodically between the information data.

29. The CDMA demodulating apparatus as claimed in claim 25, wherein said interference canceler of each stage comprises one unit of said sub-interference canceler, and memories for storing interference replicas of individual users of individual stages, using said sub-interference canceler in the mode of time division.

* * * * *